(12) United States Patent
Kajiwara et al.

(10) Patent No.: US 6,337,929 B1
(45) Date of Patent: Jan. 8, 2002

(54) IMAGE PROCESSING APPARATUS AND METHOD AND STORING MEDIUM

(75) Inventors: Hiroshi Kajiwara, Inagi; Makoto Sato, Toyko, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/160,091

(22) Filed: Sep. 25, 1998

(30) Foreign Application Priority Data

Sep. 29, 1997 (JP) .............................. 9-263765
Sep. 29, 1997 (JP) .............................. 9-263773

(51) Int. Cl.[7] ................................ G06K 9/36
(52) U.S. Cl. .................................... 382/239
(58) Field of Search .................. 382/232, 234, 382/238, 239, 240, 244, 245, 246, 247, 248; 358/432, 433; 348/384, 394, 395, 403, 404, 408, 420, 421; 341/51, 63, 65, 67, 107; 364/724.011, 724.04, 724.05, 724.13, 724.14, 725.01, 725.02

(56) References Cited

U.S. PATENT DOCUMENTS

| | | | |
|---|---|---|---|
| 4,797,945 A | 1/1989 | Suzuki et al. | 382/56 |
| 5,065,446 A | 11/1991 | Suzuki et al. | 382/56 |
| 5,241,395 A | 8/1993 | Chen | 358/261.3 |
| 5,701,367 A | 12/1997 | Koshi et al. | 382/239 |
| 5,717,394 A * | 2/1998 | Schwartz et al. | 341/51 |
| 5,748,786 A * | 5/1998 | Zandi et al. | 382/240 |
| 5,867,602 A | 2/1999 | Zandi et al. | 382/248 |
| 5,886,176 A | 3/1999 | Keith et al. | 382/248 |
| 5,966,465 A | 10/1999 | Keith et al. | 382/232 |

FOREIGN PATENT DOCUMENTS

| | | | | |
|---|---|---|---|---|
| DE | 19626600 A1 | 1/1997 | ............ | H04N/1/41 |
| EP | 0611051 A1 | 8/1994 | ............ | H04N/1/41 |
| JP | 07123273 A | 5/1995 | ............ | H04N/1/41 |

OTHER PUBLICATIONS

"A New Fast and Efficient Image CODEC Based On Set Partitioning In Hierarchical Trees,", A. Said et al., IEEE Transactions On Circuits and Systems For Video Technology, vol. 6, No. 3, Jun. 1996, pp. 243–250, XP000592420.
"Hierarchical Partition Priority Wavelet Image Compression", S.N. Efstratiadis, IEEE Transactions Image Proc., vol. 5, No. 7, Jul. 1, 1996, pp. 1111–1123, XP000593226.
"DWT Image Compression Using Contextual Bitplane Coding of Wavelet Coefficients", K. Nguyen–Phi et al., IEEE International Conference On Acoustics, Speech, and Signal Processing, IEEE Comp. Soc. Press, pp. 2969–2972, 1977, XP000788030.

* cited by examiner

Primary Examiner—Jose L Couso
(74) Attorney, Agent, or Firm—Fitzpatrick, Cella, Harper & Scinto

(57) ABSTRACT

A system which can efficiently compress any one of a multivalue image and a binary image and can preferably keep a high picture quality is provided. To accomplish this object, the system has means for generating conversion coefficients of M values by converting input image data by a first system, means for generating conversion coefficients of N values (N>M) by converting the input image data by a second system and means for outputting first information showing a position where a significant conversion coefficient exists in a block constructed by the conversion coefficients of M values or the conversion coefficients of N values and second information showing the significant conversion coefficient. Block division information which is generated by a block dividing process as an element technique of the image encoding system is efficiently entropy encoded. To accomplish it, the system has means for outputting division information showing whether each of a plurality of blocks including an encoding subject block has further been divided into a plurality of blocks or not and means for entropy encoding the division information corresponding to the encoding subject block on the basis of a presumption probability according to a division situation of a neighboring block of the encoding subject block.

18 Claims, 20 Drawing Sheets

FIG. 7F

FIG. 15A
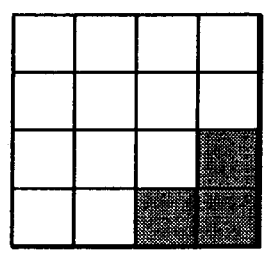
SUBJECT BLOCK
FIG. 15B
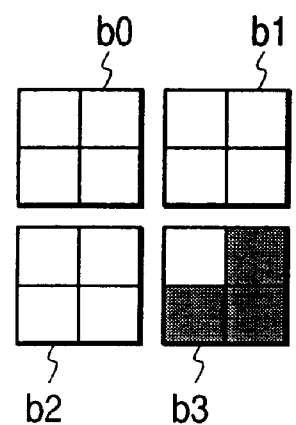
FIG. 16
| 1 | 0 | 0 | 0 | 1 | 0 | 1 | 1 | 1 |
|---|---|---|---|---|---|---|---|---|

FIG. 18A

| LL | LH |
|---|---|
| HL | HH |

FIG. 18B

| LL | LH | | |
|---|---|---|---|
| HL | HH | LH | |
| HL | | | |
| HH | | | |

| | | HL2 | HH2 | HL1 | |
|---|---|---|---|---|---|
| | | LH2 | | | |
| | LH1 | | HH1 | | |

IMAGE PROCESSING APPARATUS AND METHOD AND STORING MEDIUM

BACKGROUND OF THE INVENTION

1. Field of the Invention

The invention relates to image processing apparatus and method for efficiently compressing an image and to a storing medium in which such a method has been stored.

2. Related Background Art

In recent years, computers and networks have remarkably been developed and various information such as character data, image data, audio data, and the like are handled in a computer and in a network.

With respect to the image data and audio data, data of a relatively large data amount is often handled. Therefore, a process to reduce the data amount by compressing the image data and audio data has been performed hitherto.

For example, by compressing the image data, a large quantity of image information can be transmitted through a network at a high speed.

According to the above image compressing technique, a system (generally called a JPEG) for compressing a multi-value still image in the ITU-T Recommendation T.81 is known and a system (generally called a JBIG) for compressing a binary still image in the ITU-T Recommendation T.82 is known.

The JPEG system is suitable for compression of a natural image such as a photograph. The JBIG system is suitable for compression of a binary image such as a black and white character.

According to the conventional JPEG system and JBIG system, all images of multivalue images (photograph or the like) and binary images (character image, diagram image, or the like) cannot be efficiently compressed without deteriorating a picture quality.

To solve the above problem, a method of separating a multivalue image portion and a binary image portion in one picture plane and compressing them by different compressing systems is also known.

The JPEG system is suitable for encoding in a case where natures of images locally differ. By properly switching an encoding system every area in each block, an efficient encoding can be executed while suppressing a deterioration of the picture quality. According to the above system, after multivalue image data was converted into a frequency component every block, by entropy encoding the frequency component, even if the natures of the images locally differ, the encoding according to each block can be executed.

On the other hand, the JBIG system does not execute the encoding on a block unit basis.

However, the system for compressing the multivalue image and binary image as mentioned above does not satisfy all of the requirements of the user yet. Therefore, a new image compressing system is proposed to further improve a picture quality, a processing speed, or an encoding efficiency.

SUMMARY OF THE INVENTION

The invention is made in consideration of the above conventional systems and it is a main object of the invention to provide a new system which can efficiently compress and can keep a high picture quality for any one of a multivalue image and a binary image.

Particularly, another object of the invention is to provide an encoding system of a high compression ratio in an encoding system for encoding an image every block.

To accomplish the above objects, according to one preferred embodiment of the invention, there is provided an image processing apparatus comprising:

first converting means for generating conversion coefficients of M values by converting input image data by a first system;

second converting means for generating conversion coefficients of N values (M>N) by converting the input image data by a second system;

input means for selectively inputting the conversion coefficients of M values or the conversion coefficients of N values; and output means for outputting first information indicating a position where a significant conversion coefficient exists in a block constructed by either ones of the conversion coefficients inputted by the input means and second information indicating the significant conversion coefficient.

According to the invention, still another object of the invention is to efficiently entropy encoding block division information which is generated by a block division processing as an element technique of the new image encoding system.

To accomplish the above object, according to one preferred embodiment of the invention, there is provided an image processing apparatus comprising:

output means for outputting division information indicating whether each of a plurality of blocks including an encoding subject block has further been divided into a plurality of blocks or not; and entropy encoding means for entropy encoding the division information corresponding to the encoding subject block on the basis of a presumption probability according to a division situation of a neighboring block of the encoding subject block.

The above and other objects and features of the present invention will become apparent from the following detailed description and the appended claims with reference to the accompanying drawings.

BRIEF DESCRIPTION OF THE DRAWINGS

FIGS. 7A, 7B, 7C, 7D, 7E and 7F are diagrams showing a data format of encoding data;

FIGS. 15A and 15B are diagrams showing an example of a subject block and its dividing state;

FIG. 16 is a diagram showing a bit string for an example of the subject block shown in FIGS. 15A and 15B;

FIGS. 18A, 18B and 18C are outline diagrams of a wavelet conversion by a discrete wavelet conversion circuit 503;

DETAILED DESCRIPTION OF THE PREFERRED EMBODIMENTS

Figure 1:
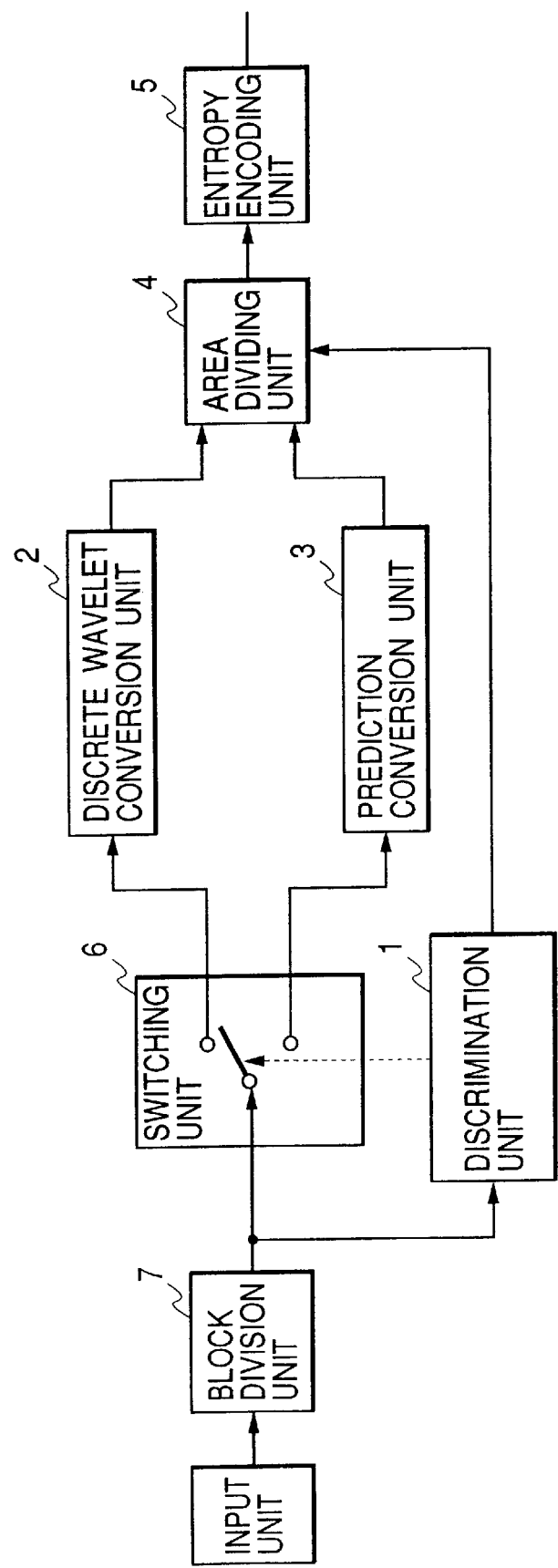
FIG. 1 is a whole circuit diagram of an image processing apparatus on the encoding side.

FIG. 1 is a schematic diagram of an image processing apparatus which is used in the first embodiment of the invention.

A flow of processes of each unit will be first simply explained.

In the diagram, image data which is inputted from an input unit in the diagram is multivalue image data having a predetermined number of bits per pixel.

In the embodiment, it is assumed that not only image data showing a photograph, a picture, or the like suitable for multivalue expression but also image data showing characters, diagram, or the like to be inherently expressed by a binary value is included in the multivalue image data having a depth of 8 bits per pixel.

In the embodiment, therefore, to efficiently encode image data showing an image in which those images mixedly exist, the former image is encoded as multivalue image data and the latter image is encoded as binary image data, thereby improving an encoding efficiency.

Subsequently, the inputted multivalue image data is supplied to a block division unit 7. The block division unit 7 divides the multivalue image data into multivalue image data corresponding to a block of a predetermined size shown in FIG. 2, for example, a size of Hb pixels in the vertical direction and Wb pixels in the lateral direction and sequentially outputs the divided multivalue image data on a block unit basis.

The outputted multivalue image data is inputted to a discrimination unit 1 in FIG. 1. The discrimination unit 1 detects the number of gradations which one pixel has, thereby discriminating whether the multivalue image data indicates a binary image or a multivalue image. The image data discriminated by the discrimination unit 1 is also inputted to a switching unit 6.

On the basis of a discrimination result of the discrimination unit 1, the multivalue image data inputted to the switching unit 6 is outputted to a prediction conversion unit 3 if it is the multivalue image data to be expressed as a binary image and is outputted to a discrete wavelet conversion unit 2 if it is the multivalue image data to be expressed as a multivalue image. That is, a flowing direction of the multivalue image data of the switching unit 6 is switched on the basis of the discrimination result of the discrimination unit 1.

Predetermined converting processes are performed to the multivalue image data inputted to the discrete wavelet conversion unit 2 or prediction conversion unit 3. Each of the converting processes will be described hereinlater.

Conversion coefficients after they were converted by the conversion units are inputted to an area dividing unit 4. The discrimination result for each block by the discrimination unit 1 is also inputted to the area dividing unit 4.

In the area dividing unit 4, the conversion coefficients which are inputted are compared with a predetermined threshold value. On the basis of comparison results, the conversion coefficients are further sequentially divided into small areas. A dividing process will be also explained hereinlater.

The area dividing unit 4 outputs division information indicative of a result of the dividing process of the block and the actual values and positive and negative signs of the conversion coefficients as bit data. The division information and the bit data are inputted to an entropy encoding unit 5 at the post stage.

The entropy encoding unit 5 entropy encodes the inputted bit data and outputs final encoded data.

The detailed operation of each block will now be described.

The block division unit 7 divides the inputted multivalue image data into blocks of a predetermined size and sequentially outputs the multivalue image data on a divided block unit basis.

Figure 2:
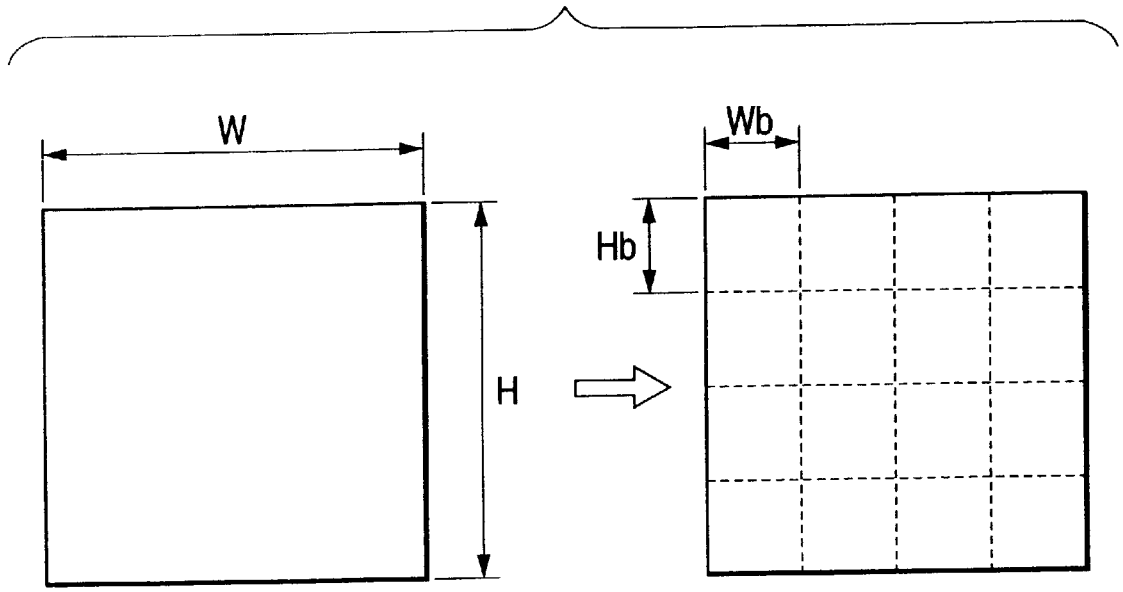
FIG. 2 is a diagram for explaining a block dividing method of a block division unit 7.

It is now assumed that the multivalue image data divided into rectangular areas of a size of Hb pixels in the vertical direction and Wb pixels in the lateral direction as shown in FIG. 2 is outputted.

The discrimination unit 1 checks each bit of the inputted multivalue image data and discriminates whether the multivalue image data should be expressed as a binary image (character, diagram, or the like) or a multivalue image (natural image such as photograph, picture, or the like).

Figure 3:
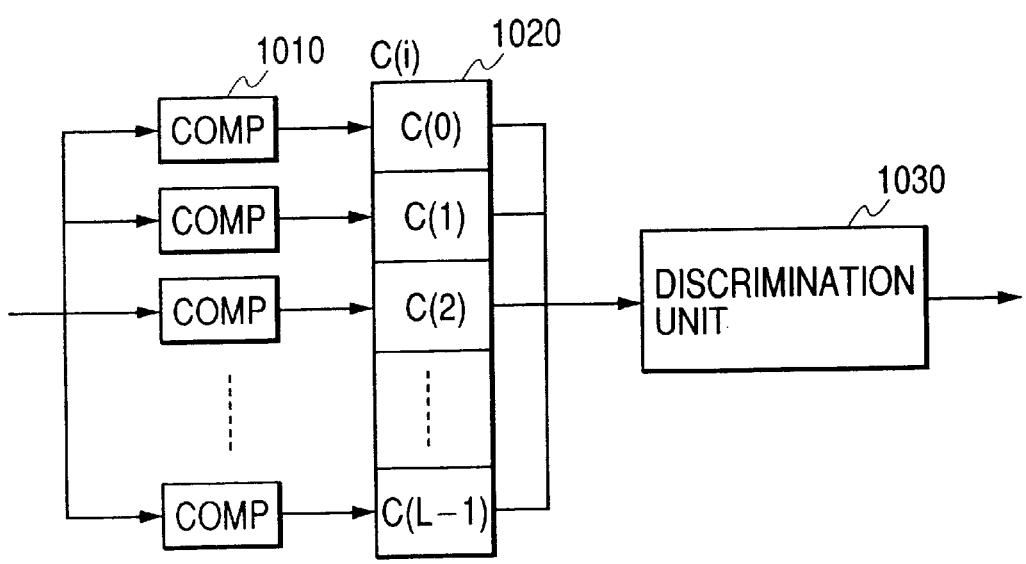
FIG. 3 is an outline explanatory diagram of a discrimination unit 1.

FIG. 3 is a conceptual diagram showing the operation of the discrimination unit 1. The inputted image data is compared by a comparison unit 1010 and a comparison result is inputted to a counter array 1020.

Each reference value of the comparison unit 1010 corresponds to a pixel value of the multivalue image data which is inputted and its number L is set to be equal to the maximum level number (for example, 256) which can be presumed for the multivalue image data.

The comparison unit 1010 generates "1" when the result of the inputted image data is equal to each reference value and the result becomes an input to a corresponding counter of the counter array 1020. On the other hand, the image data inputted to the comparison unit 1010 is counted every pixel. At a time point when all of the pixels in the relevant block are compared, the contents of the counter array 1020 are outputted to a discrimination unit 1030 and the contents of the counter array 1020 are reset. The discrimination unit 1030 scans the contents of each counter $C(i)$ and counts the number $N_c$ of counters of $$C(i) \neq 0 (i=0, \ldots, L-1) \qquad (1)$$

When $$N_c = 2 \qquad (2)$$

it is determined that the image data should be expressed as a binary image. When $$N_c > 2 \tag{3}$$

it is decided that the image data should be expressed as a multivalue image.

A discrimination result is outputted to the switching unit 6 and area dividing unit 4.

On the basis of the discrimination result inputted from the discrimination unit 1, if the multivalue image data which is inputted should be expressed as a multivalue image, the switching unit 6 switches so as to output it to the discrete wavelet conversion unit 2. If the multivalue image data which is inputted should be expressed as a binary image, the switching unit 6 switches so as to output it to the prediction conversion unit 3.

Encoding Process as a Multivalue Image

Subsequently, a case where the multivalue image data which is inputted should be expressed as a multivalue image, namely, it should be processed as multivalue image data as it is (case where the discrete wavelet conversion unit 2 is made operative) will be described.

The discrete wavelet conversion unit 2 performs a discrete wavelet conversion to the inputted multivalue image data and divides it into a predetermined number of frequency bands (hereinafter, referred to as subbands).

Figure 4A:
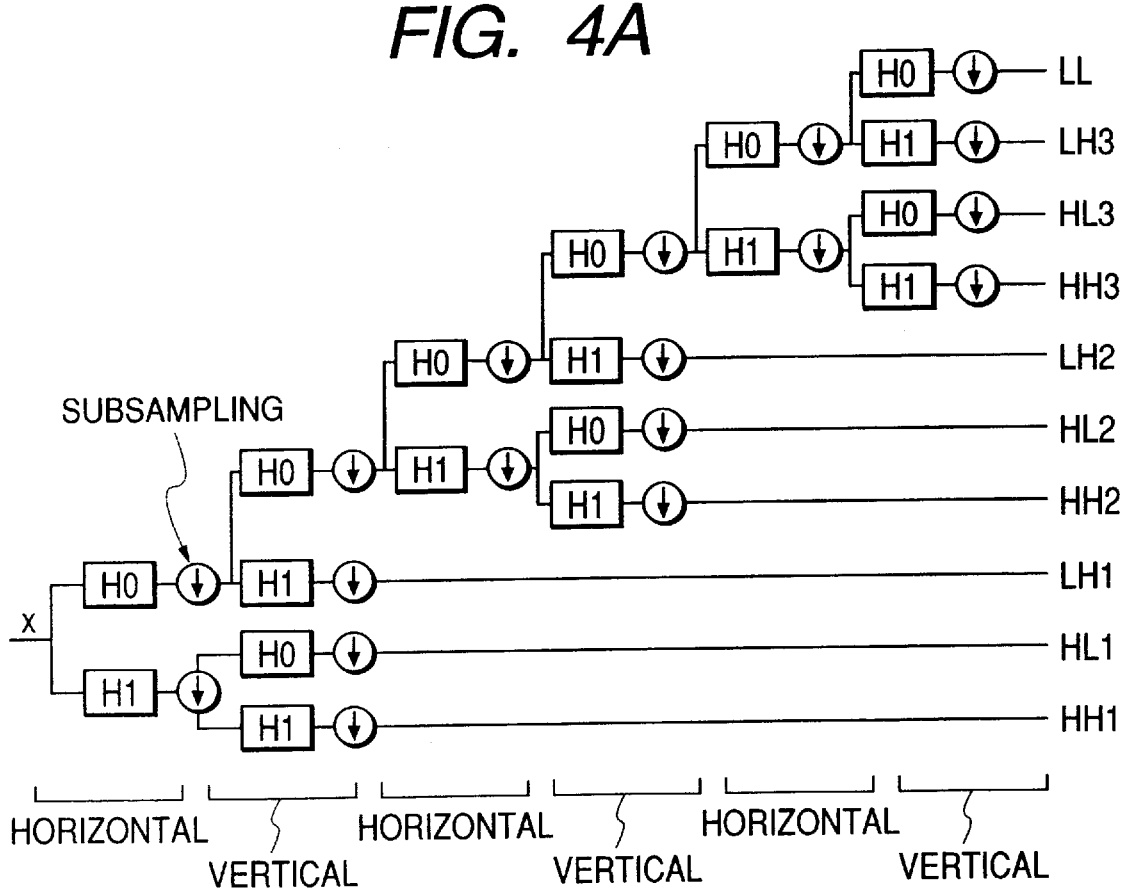
FIGS. 4A and 4B are outline explanatory diagrams of a discrete wavelet conversion unit 2.
Figure 4B:
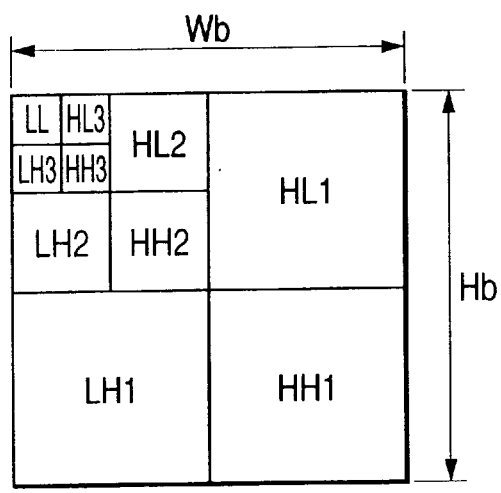

FIG. 4A shows a schematic diagram to execute the discrete wavelet conversion. FIG. 4B shows a conceptual diagram of subbands which are generated by the converting process.

In FIG. 4A, multivalue image data x which is inputted passes either a low pass filter H0 or a high pass filter H1 with respect to each of the horizontal and vertical directions as shown in the diagram. By performing a sub-sampling each time the data x passes the filter, the data is divided into a plurality of frequency bands.

FIG. 4B shows a processing result that is obtained by performing conversions of three stages shown in FIG. 4A to the multivalue image data corresponding to the Wb pixels in the lateral direction and the Hb pixels in the vertical direction.

In the embodiment, a size of block shown in FIG. 4B corresponds to a size (Wb×Hb) of the image divided into blocks by the block division unit 7.

It is assumed that each filter which is used in the embodiment is a reversible filter such that data can be perfectly reproduced at the time of image decoding.

For example, a result r obtained by performing filtering process by the low pass filter H0 and a sub-sampling to the multivalue image data x is expressed by the following relational equation (4). A result d obtained by performing a filtering process by the high pass filter H1 and a sub-sampling to the multivalue image data x is expressed by the following relational equation (5).

$$r(n) = <<(x(2n)+x(2n+1))/2>> \tag{4}$$

$$d(n) = x(2n+2)-x(2n+3)+<<(-r(n)+r(n+2)+2)/4>> \tag{5}$$

where, $<<X>>$: the maximum integer which does not exceed X

The discrete wavelet conversion unit 2 sequentially repeats the filtering process and the sub-sampling in the horizontal and vertical directions as shown in FIG. 4A as mentioned above and sequentially divides each block image which is inputted to a plurality of subbands.

FIG. 4B shows a name of each subband obtained by FIG. 4A and a spatial positional relation. In each subband, a conversion coefficient (frequency component) corresponding thereto is included. The conversion coefficients which are derived by the discrete wavelet conversion unit 2 are outputted to the area dividing unit 4 at the post stage on a subband unit basis.

In the embodiment, a subband of LL is first outputted, subbands of HL3, LH3, and HH3 are outputted, subbands of LH2, HL2, and HH2 are outputted, and subbands of LH1, HL1, and HH1 are subsequently outputted. By outputting the subbands as mentioned above, the frequency components can be sequentially decoded from the low frequency component (LL) on the decoding side and an outline of the image can be early recognized.

In the area dividing unit 4 for inputting the conversion coefficients (multivalues) from the discrete wavelet conversion unit 2, only the coefficients having values within a certain predetermined range (in case of expressing the conversion coefficients of multivalues by a bit plane, coefficients existing in a bit plane in which the maximum significant coefficient bit indicates a value within a predetermined range (which is equal to or larger than $n_{max}$, which will be explained hereinlater)) are extracted from the conversion coefficients and the information of each of the extracted coefficients is outputted as a bit data string.

FIGS. 5A to 5E show a conceptual diagram for explaining the operation of the area dividing unit 4.

Figure 5C:
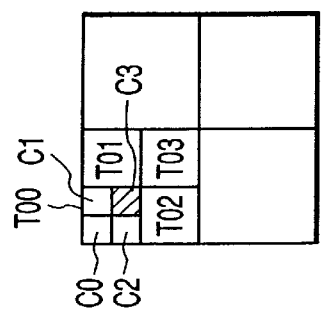
FIGS. 5A, 5B, 5C, 5D and 5E are outline explanatory diagrams of an area dividing unit 4.
Figure 5B:
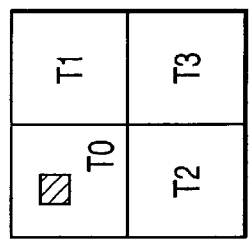
Figure 5A:
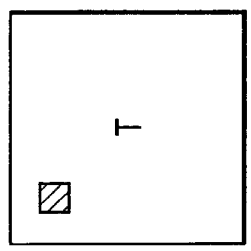
Figure 5D:
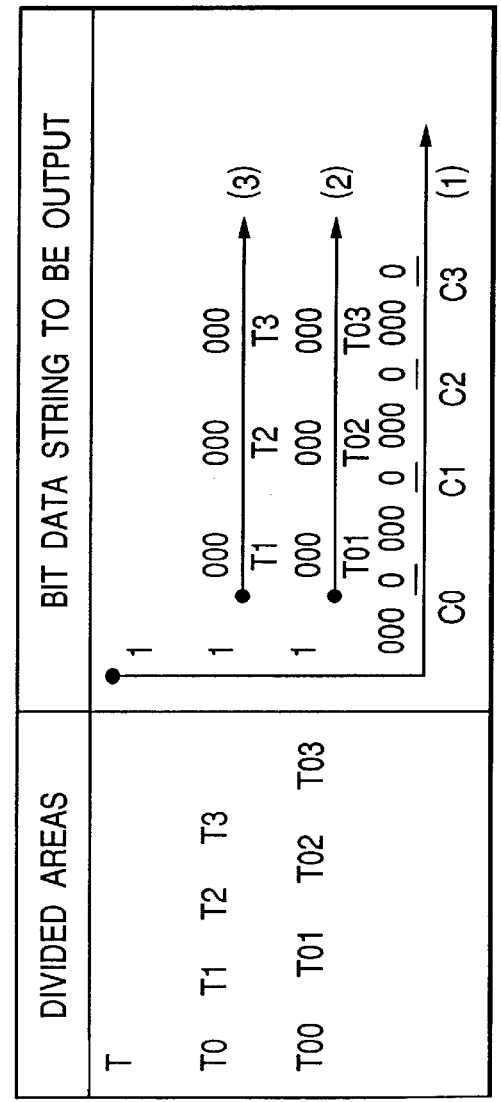
Figure 5E:
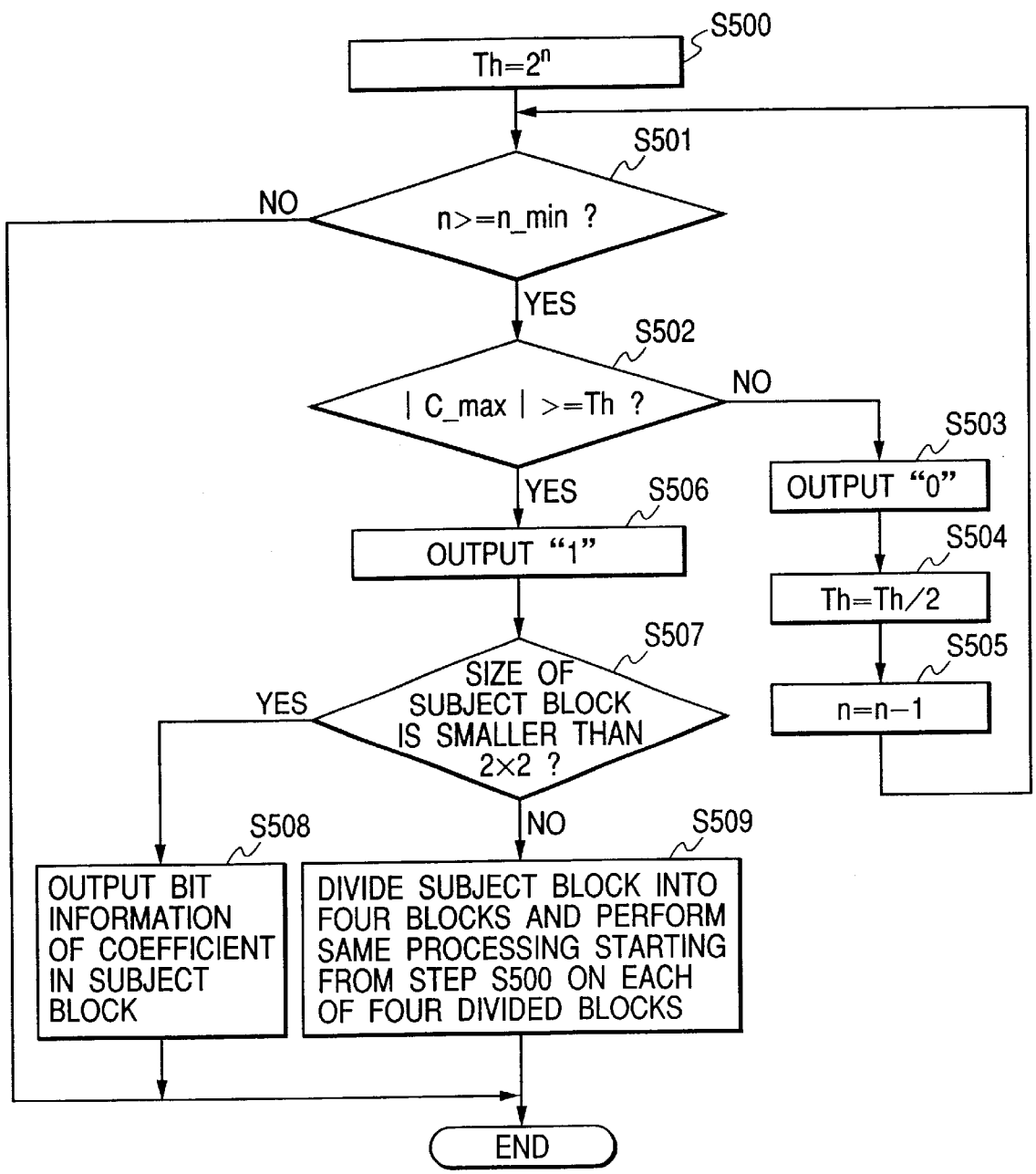

For the subbands which are sequentially inputted, the area dividing unit 4 converts the conversion coefficients in each subband into a bit data string in accordance with a procedure shown in a flowchart of FIG. 5E. Explanation will now be made with reference to the flowchart.

First, although sizes of subbands which are inputted are not always the same size as shown in FIG. 4B, the inputted subbands themselves are defined as a subject block T as shown in FIG. 5A.

A maximum value $c_{max}$ for all of the conversion coefficients $c_{ij}$ in the subject block T is subsequently obtained. Further, $n_{max}$ is obtained as follows and is set to an initial value of a subject bit plane number n.

$$n_{max} = \log_2(|c_{max}|) \tag{6}$$

In step S500, a threshold value Th regarding the subject block T is obtained by the following equation (7) by using the value of the number n which has been set at present.

$$Th = 2^n \tag{7}$$

In step S501, when the present number n is less than a predetermined minimum bit plane number $n_{min}$, the process of the subject block T is finished.

In steps S502, S503, S504, and S505, with respect to the present number n, when the maximum value $c_{max}$ of the coefficients in the subject block T is as follows, $$|c_{max}| \geq Th \tag{8}$$

it is determined that there are significant conversion coefficients in the subject block T. The processing routine advances to step S506.

When the equation (8) is not satisfied, step S503 follows and bit data "0" indicating that no significant conversion coefficient exists in the subject block T is generated.

In steps S504 and S505, the threshold value Th is set to Th/2 and the value of n is reduced by "1" (height of bit plane which is used as a threshold value is reduced by "1"). After that, the processing routine is returned to step S501.

In step S506, bit data "1" showing that the significant conversion coefficients exist in the subject block T is generated.

In step S507, whether a size of present subject block T is equal to or less than a predetermined size (two pixels in both of the vertical and lateral directions in the embodiment) or not is discriminated. As a result of the discrimination, when the size of subject block T is equal to or less than the predetermined size, step S508 follows. When it is larger than the predetermined size, step S509 follows.

In step S508, bit data within a range from the nth bit plane to the $n_{min}$th bit plane corresponding to all of the coefficients (four coefficients in case of the embodiment) in the subject block T and sign bits of the coefficients are generated.

In step S509, the subject block T is further divided into four subject blocks $T_m$ of a small size. Processes in step S500 and subsequent steps are repeated with respect to each of the subject blocks $T_m$.

The above procedure will now be described with regard to specific examples. FIG. 5A shows the subject block T (each subband in FIG. 4B) which is first defined. The subject block T in this case is constructed by (8×8) conversion coefficients.

As for the significant conversion coefficients, one (a value is "40") significant conversion coefficient shown by a hatched region exists in the subject block T and has the maximum value in the block. The other conversion coefficients are not significant and their values are equal to "0".

When the process to sequentially divide the subject block T into the subject blocks Tm is executed in accordance with the procedure of FIG. 5E, it is divided in accordance with the order of FIG. 5A→FIG. 5B→FIG. 5C, so that a bit data string as shown in FIG. 5D is outputted.

The above process relates to the case where n=5 and $n_{min}$=3.

By executing the above process, a bit data string as shown in FIG. 5D such that the position and value of each coefficient can be expressed can be outputted from the block comprising a plurality of multivalue coefficients. Arrows (1), (2), and (3) shown in FIG. 5D indicate the order by which the bit data is generated by the process and the order in which it is outputted to the post stage. The bits are outputted in accordance with the order of the arrows (1)→(2)→(3).

The above processes will now be described in detail hereinbelow.

At the time point of FIG. 5A, a check is first made to see whether there is a coefficient in which the significant bit exists on the bit plane of the fifth bit or not. In this instance, it will be understood that only one such coefficient (significant coefficient) exists.

Subsequently, since the position of the significant coefficient is not specified in the state of FIG. 5A, the subject block T is divided into four blocks as shown in step S509. Thus, subject blocks of T0 to T3 shown in FIG. 5B are decoded. At this time, bit data "1" showing that the subject block T was divided into four blocks is outputted.

Similar processes are executed with respect to each of the subject blocks T0 to T3. That is, the processes in step S500 and subsequent steps are also executed for the blocks T0 to T3.

Although the above processes are first executed with respect to the subject block T0, after the presence of the significant coefficients was decided in step S502, the subject block is further divided into four blocks T00 to T03. At this time, bit data "1" showing that the subject block T0 was divided into four blocks is generated.

Since the block T0 is further divided into four blocks, the processes from step S500 are executed with respect to each of the blocks T00 to T03 prior to processing the blocks T1 to T3.

When the above processes are executed with respect to the subject block T00, since a size of subject block T00 is equal to (2×2) pixels in step S507, the processing routine advances to step S508. Therefore, as for the block T00, the data of the fifth to third bits corresponding to each coefficient in the block, namely, 3-bit data "000", "000", "000", and "101" showing the presence or absence of the significant coefficient and 1-bit data "0", "0", "0", and "0" showing the positive or negative sign of each coefficient are sequentially outputted in accordance with the order shown in the drawing. The above procedure corresponds to the arrow (1).

The processes for T00 are finished as mentioned above. Subsequently, processes for T01 are executed. No significant coefficient exists in the third to fifth bits in each conversion coefficient in T01. Therefore, by repetitively executing the processes in steps S502 and S503 to S505 to n=3, 4, and 5, "0" indicative of "the absence of the significant coefficient" is generated until the number n is less than 3. Subsequently, processes for T02 and T03 are similarly executed, so that "000", "000", and "000" are outputted. The above procedure corresponds to the arrow (2).

Since the processes for T0 (T00 to T03) are finished as mentioned above, T1 to T3 are subsequently processed. Since no significant coefficient exists in the third to fifth bits in any one of the conversion coefficients in T1 to T3, "000", "000", "000" are outputted in a manner similar to T01 to T04. The procedure corresponds to the arrow (3).

The bit data outputted by the above processes is supplied to the entropy encoding unit 5 at the post stage.

Encoding process as a binary image

Explanation will now be made with respect to the case where the multivalue image data which is inputted should be expressed as a binary image by the discrimination unit 1, namely, it should be processed as binary image data (case where the prediction conversion unit 3 is made operative).

When it is decided that the multivalue image data which is inputted should be expressed as a binary image, the multivalue image data is outputted to the prediction conversion unit 3 by the switching unit 6. The prediction conversion unit 3 converts the multivalue image data which is inputted on a pixel unit basis as a binary image into prediction error data.

Figures 6A, 6B:
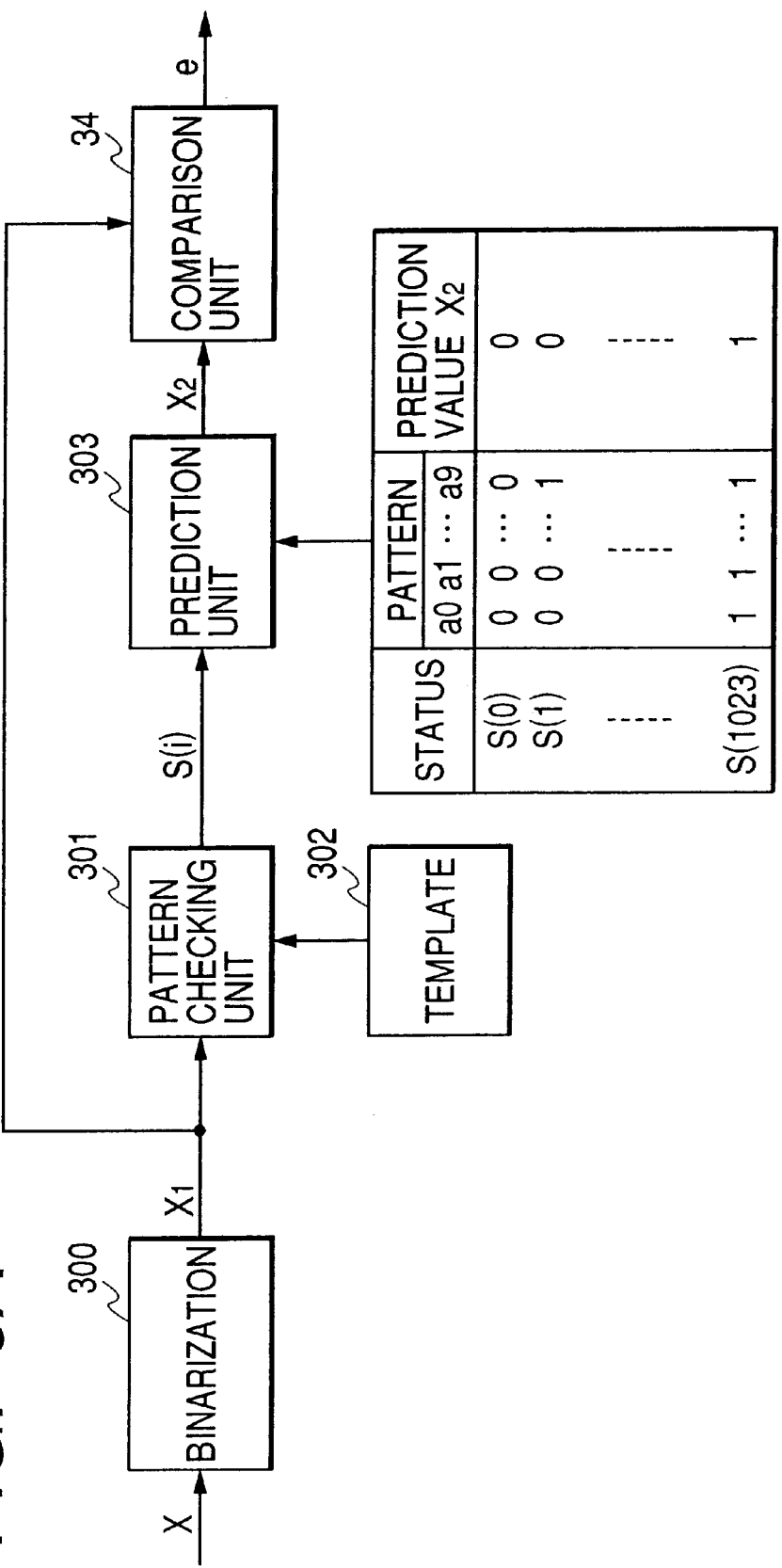
FIGS. 6A and 6B are outline explanatory diagrams of a prediction conversion unit 3.

FIGS. 6A and 6B are conceptual diagrams for explaining the operation of the prediction conversion unit 3. In FIGS. 6A and 6B, when the multivalue image data x is inputted on a pixel unit basis from the switching unit 6, a binarization unit 300 converts it into binary image data $x_1$ of every pixel and outputs.

A pattern checking unit 301 extracts peripheral pixels (10 pixels shown in FIG. 6B, which will be explained hereinlater) of the pixel shown by $x_1$ (referred to as an encoding subject pixel). At the same time, a template 302 in which all of possible combinations of the peripheral pixels and information (corresponding to a status S(i), which will be explained hereinlater) showing the combinations are stored is referred.

Thus, the status S(i) corresponding to the extracted actual peripheral pixels is decided and outputted to the post stage. The status S(i) is used for generation of a prediction value when encoding the inputted encoding subject pixel.

FIG. 6B shows a positional relation between the present encoding subject pixel $x_1$ to be encoded and the peripheral pixels which are extracted to generate the status S(i). In the diagram, a0 to a9 denote pixels which have already been encoded.

The status S(i) will now be specifically explained. Since the binary image data $x_1$ which is inputted is image data of one bit of each pixel, each pixel value has either 0 or 1. Therefore, the number of combinations of the possible values of the peripheral pixels a0 to a9 of the encoding subject pixel is equal to 1024.

This state is the status S(i) showing a situation of the pixel values of the peripheral pixels of the actual encoding subject pixel. "i" denotes that the status corresponds to the ith combination among the 1024 combinations.

In the embodiment, since the binary image data $x_1$ is inputted to the pattern checking unit 301 by completing in the block of (Hb×Wb) pixels, in the encoding subject pixels existing at the left edge, upper edge, and right edge of the block, there is a case where the above 10 peripheral pixels do not exist. In the embodiment, in order to cope with such a situation, the processes are performed on the assumption that "0" exists in the peripheral pixels which do not actually exist.

The status S(i) is inputted to a prediction unit 303. The prediction unit 303 outputs any one of prediction values $x_2$ stored in correspondence to each inputted status S(i) to a comparison unit 304. That is, the prediction unit 303 is a look-up table. The prediction value $x_2$ corresponding to each status S(i) is the optimum value obtained by previously analyzing a binary sample image.

The binary image data $x_1$ is also inputted to the comparison unit 304. That is, the data $x_1$ of a certain encoding subject pixel and the prediction value $x_2$ obtained by predicting the encoding subject pixel on the basis of the 10 peripheral pixels are simultaneously inputted to the comparison unit 304.

The comparison unit 304 compares the data $x_1$ of the encoding subject pixel with the prediction value $x_2$, generates "0" as a prediction error e when they coincide, and generates "1" as a prediction error e when they do not coincide. The above processes are sequentially executed for the data $x_1(x)$ of all of the pixels which are inputted.

Since the block division unit 7 executes the switching and output of the image data on a block unit basis of a predetermined size to the discrete wavelet conversion unit 2 or prediction conversion unit 3, the process of the prediction conversion unit 3 is completed every predetermined size of (Hb×Wb). Therefore, by constructing the prediction error e outputted every block of each predetermined size so as to have a relation similar to the actual position of each encoding subject pixel, a map E of a size (Hb×Wb) is constructed.

The map E obtained by the prediction conversion unit 3 is subsequently outputted to the area dividing unit 4. The area dividing unit 4 handles the map E in a manner similar to the subbands outputted from the discrete wavelet conversion unit 2, so that the map E is processed by using almost similar processing steps. The area dividing unit 4 outputs division information showing a division result when the map E is divided and the actual prediction error values and positive/negative signs of the conversion coefficients as bit data.

Different from the conversion coefficients in the subband outputted from the discrete wavelet conversion unit 2, the prediction error value in the map E is limited to 0 or 1. Therefore, on the basis of a result of the discrimination which is inputted from the discrimination unit 1, namely, on the basis of information showing whether the inputted conversion coefficients construct the subband which is generated from the discrete wavelet conversion unit 2 or construct the map E which is generated from the prediction conversion unit 3, the area dividing unit 4 switches the area dividing process and a outputting method of the bit data string.

Specifically speaking, as for the conversion coefficients, for the case where the subband inputted from the discrete wavelet conversion unit 2 is divided into areas and the bit data string as shown in FIG. 5D is outputted, in the case where the map E inputted from the prediction conversion unit 3 is divided into areas and the bit data string is outputted, the following changes are executed.

(1) At the time of initialization, the dividing subject area T is set to the whole map E and $$n_{max}=0 \quad (9)$$

is set. The subject bit plane number n and the minimum bit plane number $n_{min}$ are set to 0.

(2) The block comprising the multivalue conversion coefficients is not divided but it is sufficient to merely divide the block comprising the 1-bit prediction error coefficients. Therefore, data indicative of one bit of the prediction error is outputted in place of outputting three bits indicative of the presence or absence of the significant coefficients and one bit showing the positive/negative sign as shown in FIG. 5D. For example, now assuming that T shown in FIG. 5A indicates the map E (a hatched area c3 indicates the prediction error value "1" and the other areas show "0"), bit data strings which are outputted are as follows in FIG. 5D.

c0=c1=c2=0
c3=1
T01=T02=T03=0
T1=T2=T3=0

That is, the bit data string "1110001000000" is outputted in accordance with the order of the arrows (1), (2), and (3).

The construction except for the above two points is fundamentally similar to that in case of area dividing the multivalue conversion coefficients and its description is omitted.

The bit data string outputted as mentioned above is encoded by the entropy encoding unit 5 and is outputted as final encoded data.

Data Format

FIGS. 7A to 7F show conceptual diagrams of a data format of encoded data which is generated by the encoding as a multivalue image or the encoding as a binary image described above.

Figure 7A:
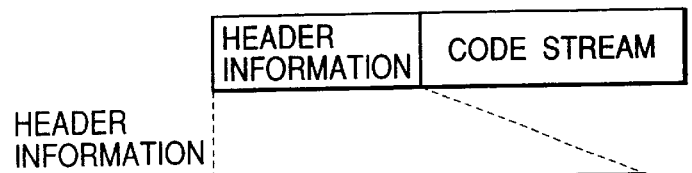

FIG. 7A shows a whole construction of the encoded data which is finally outputted by the image processing apparatus of the embodiment. The encoded data is constructed by header information and a code stream.

Figure 7B:
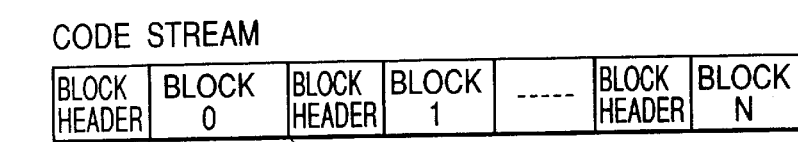

As shown in FIG. 7B, the header information is constructed by: geometry information including the size of encoded image, the block size (Hb×Wb) obtained by dividing the image, and other information which is necessary upon decoding; and a level number of the discrete wavelet conversion (DWT).

Figure 7C:
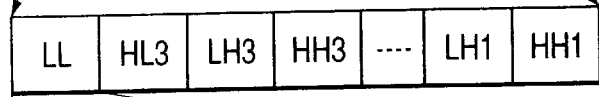

As shown in FIG. 7C, a code stream is constructed by setting the divided block (Hb×Wb) to one unit. A block header is included in one unit.

A flag indicating whether the relevant block has been encoded as a multivalue image or encoded as a binary image is included in the block header.

Further, in the case where the block is encoded as a multivalue image, the number $n_{max}$ of the highest bit plane in which the significant coefficient exists among the multivalue bits showing each conversion coefficient in the block is included in the block header. That is, the value $n_{max}$ can be also different every block that is encoded as a multivalue image. In the embodiment, $n_{min}$ is common to each block to be encoded as a multivalue image. However, by constructing such that the information of $n_{min}$ is also included in the encoded data in a manner similar to $n_{max}$, $n_{min}$ can be changed every block to be encoded as a multivalue image. In the case where the block is encoded as a binary image, the information of $n_{max}$ and $n_{min}$ is unnecessary.

Figure 7D:

FIGS. 7D and 7F show constructions of code streams corresponding to each block divided by the block division unit 7.

FIG. 7D shows a construction of the code stream in the case where the block is encoded as a multivalue image. The code stream is further constructed every subband of the discrete wavelet conversion.

Figure 7E:
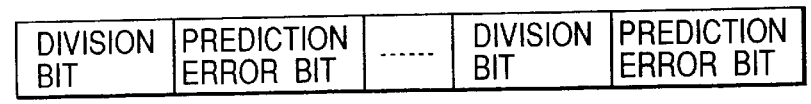

FIG. 7E shows a data format corresponding to one subblock among the subblocks shown in FIG. 7D. Each subblock has a similar data format. LL to HH1 denote the same denominations as those of the subbands shown in FIG. 4B.

According to the contents in FIG. 7E, two kinds of bit streams of a division bit and a coefficient bit alternately appear as shown in the diagram. The division bit is a bit which is outputted in steps S503 and S506 in the flowchart of FIG. 5E and the coefficient bit is a bit which is outputted in step S508.

FIG. 7F shows a construction of the code stream in the case where the block is encoded as a binary image. The code stream has a format such that the division bit and a prediction error bit are alternately arranged.

Decoding Process

A method of decoding the encoded data formed by the encoding method of the embodiment will now be described.

Figure 8:
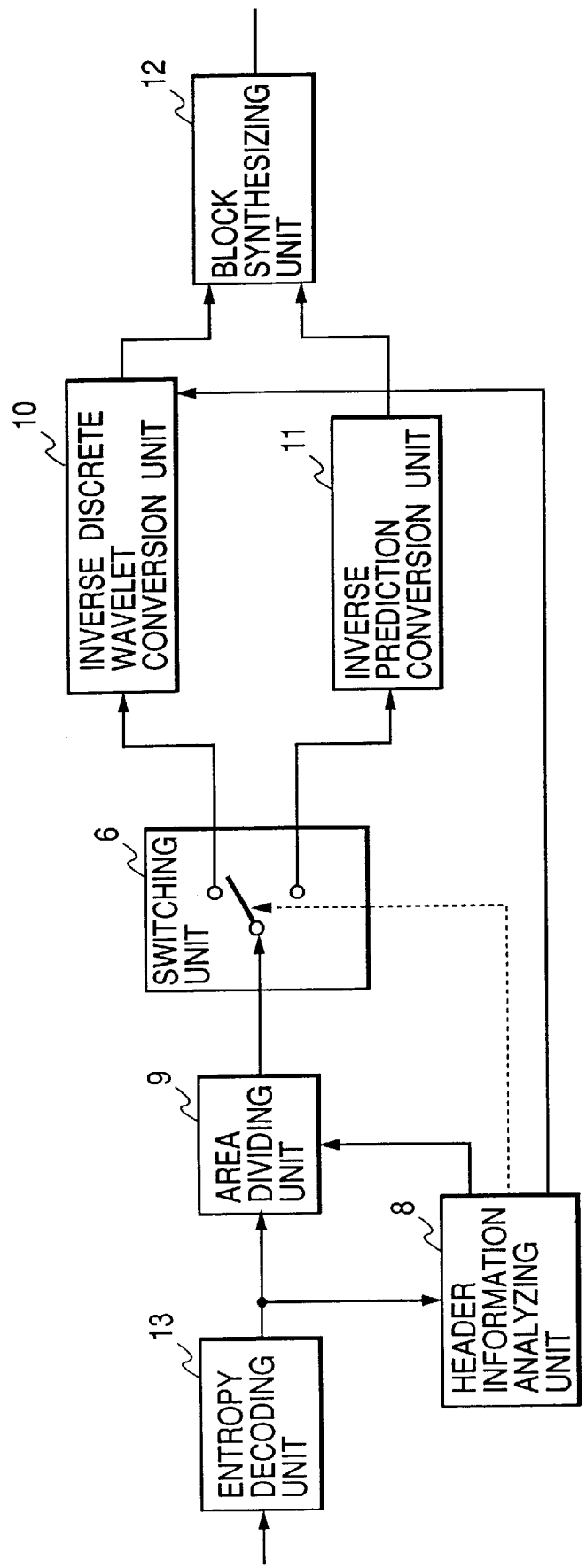
FIG. 8 is a whole circuit diagram of an image processing apparatus on the decoding side.

FIG. 8 is a block diagram showing a decoding apparatus for decoding the encoded data formed by the encoding method of the embodiment. Explanation will now be made in detail hereinbelow with reference to FIG. 8.

The encoded data inputted through a transmission path or an accumulating media is decoded by an entropy decoding unit 13. In a header information analyzing unit 8, necessary information such as size of original image, size of block, and the like is read out and stored as information necessary for decoding.

The block header (refer to FIG. 7C) in the encoded data is read out and whether the blocks which are sequentially read out have been encoded as multivalue images or encoded as binary images is discriminated. A discrimination result is outputted to the switching unit 6. Further, for the block encoded as a multivalue image, $n_{max}$ is read and stored.

The code streams (refer to FIGS. 7C to 7F) read out on a block unit basis are inputted to an area dividing unit 9. The area dividing unit 9 is used to decode data (the subblock comprising the conversion coefficients or the map E) just before it is inputted to the area dividing unit 4 in FIG. 1 from the division bit and coefficient bit by which the relevant block is divided upon encoding or the prediction error bit.

Figure 9A:
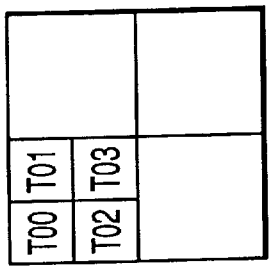
FIGS. 9A, 9B, 9C, 9D, 9E and 9F are diagrams showing a state of an image decoding on the decoding side.
Figure 9B:
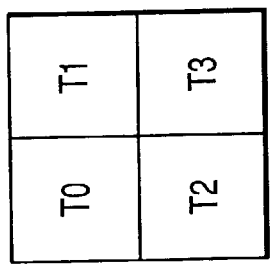
Figure 9C:
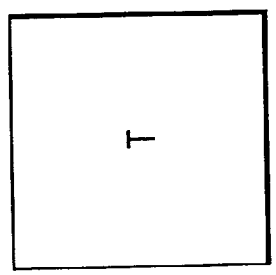
Figure 9D:
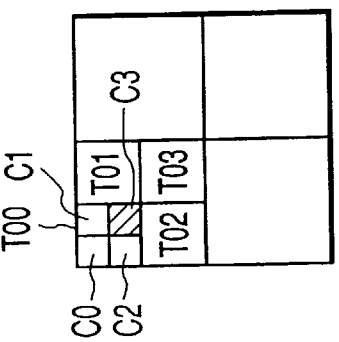

The operation of the area dividing unit 9 in the case where a certain block shown by the encoded data that is inputted has been encoded as a multivalue image will now be described hereinbelow with reference to a flowchart of FIG. 9F. In the embodiment, it is assumed that the order when a plurality of subbands are encoded (area divided) on the encoding side has been predetermined.

First, the area of the relevant subband is assured from the code stream corresponding to a certain subband. The area corresponding to the size of this subband is set to an initial value of the subject block T. All of the coefficients in the area are initialized to 0. The value of $n_{max}$ which is derived from the block header is set to an initial value of the subject bit plane n.

Subsequently, in step S900, when the value of n is less than the predetermined minimum bit plane number $n_{min}$, the processes of the subject block T are finished.

In step S901, one division bit is read out from the code stream.

In steps S902 and S903, the value of the read division bit is checked. When it is equal to 0, 1 is subtracted from n and the processing routine is returned to step S900.

In steps S904 and S905, when the size of present subject block T is equal to or less than a predetermined size, for example, the size of 2 pixels in the vertical and lateral directions, the coefficient bit is read out from the code stream and all of the coefficients in the area are decoded.

In step S906, the present subject block T is divided into four small areas $T_m$ and the same processes as those in the processes in step S900 and subsequent steps are sequentially executed with respect to each of the small areas.

The above procedure will now be described in detail with respect to specific examples. FIGS. 9A to 9E show decoding states of the subject block T and code streams (bit data strings) regarding the subject block T which are sequentially inputted.

Figure 9E:
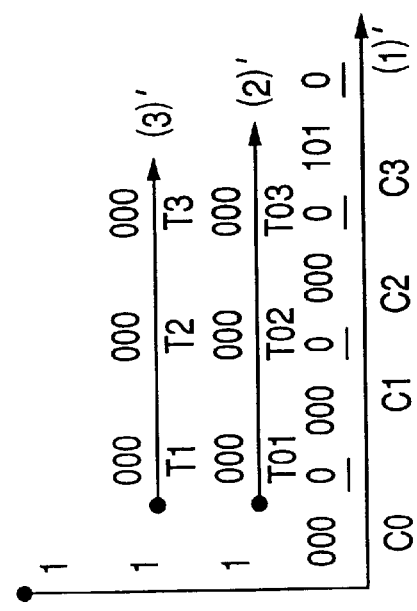
Figure 9F:
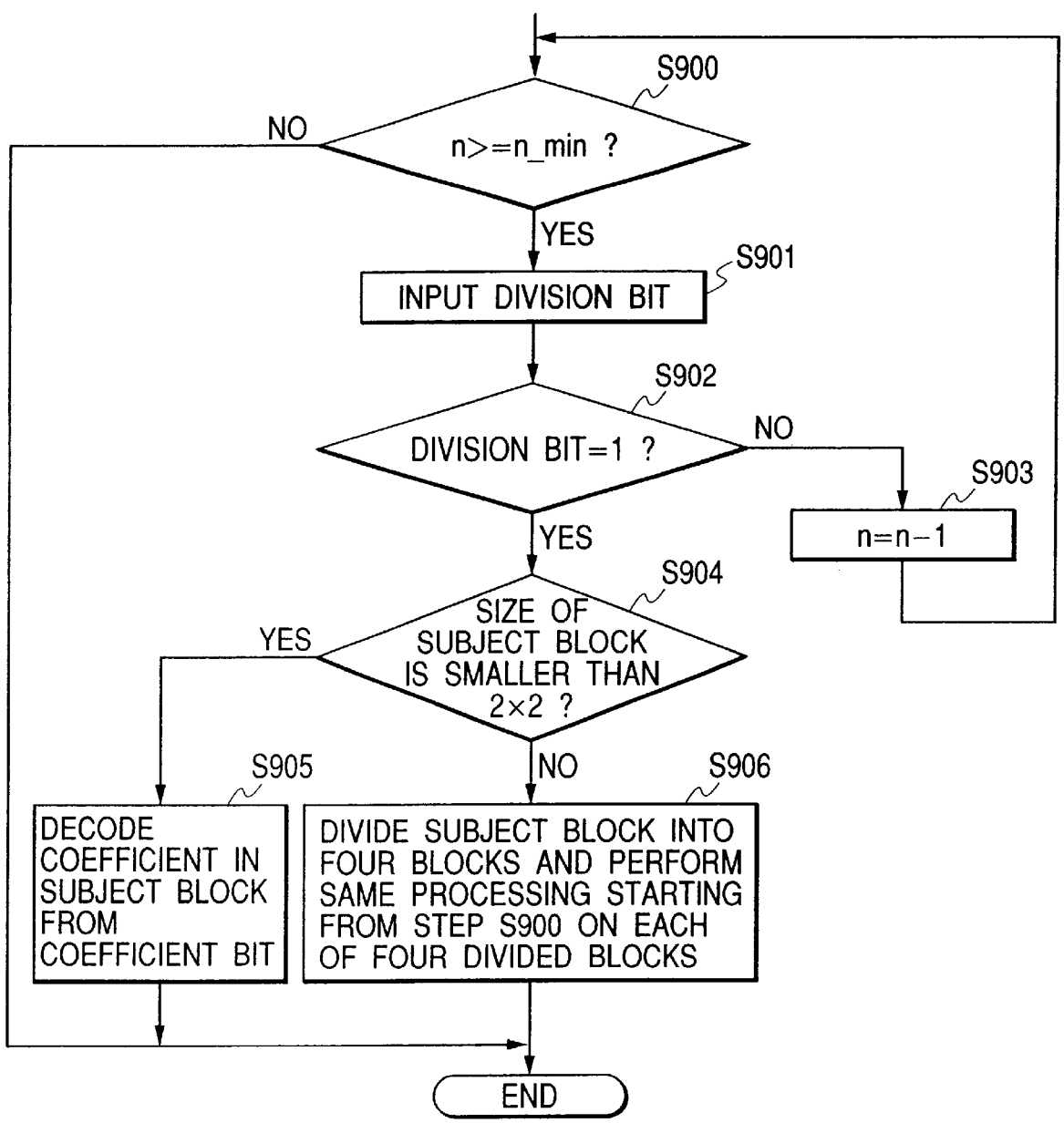

Arrows (1)', (2)', and (3)' shown in FIG. 9E indicate the orders in which the bit data strings are actually inputted every bit in accordance with the order of (1)', (2)', and (3)'.

In the initial state, as shown in FIG. 9A, all of the subject blocks T have been initialized to 0 and are not divided. In step S901, the division information "1" of first one bit of the arrow (1)' is inputted. Thus, it is recognized that the subject block T includes the significant coefficient with respect to the present bit plane n. In step S906, the block T is divided into four small blocks T0 to T3. This procedure is shown as a state of FIG. 9B.

A decoding process of T0 will now be executed. First, since the second bit (division bit "1") of the arrow (1)' is inputted in step S901, it is possible to decide that there is the significant pixel in the conversion coefficients in T0. Therefore, the block T0 is further divided into four small blocks T00 to T03 (refer to FIG. 9C).

Since the first small block T0 is further divided into small blocks here, the decoding process of T00 to T03 is preferentially executed.

First, with respect to the block T00, the processes are executed from step S900. In step S901, the division bit shown in the third bit (division bit "1") of the arrow (1)' is inputted and it is possible to decide that the significant conversion coefficient exists in T00. However, since the size of T00 corresponds to the size of two pixels in the vertical and lateral directions, T00 is not further divided. The processing routine advances to step S905 and the remaining bit data strings of the arrow (1)' are inputted.

Now, since $n_{max}$=5 has been known from the information included in the encoded data and the value of $n_{min}$ has also previously been known, by which number of bits each conversion coefficient is expressed can be decided. Therefore, first three bits in the bit data strings which are inputted are inputted as values showing the third to fifth bits of c0 and subsequent one bit is inputted as a positive/negative sign of the conversion coefficient. By this method, a conversion coefficient "40" of c0 is decoded. Similarly, with regard to c1 to c3 as well, the data is inputted and the conversion coefficient "0" is decoded (refer to FIG. 9D).

Since the block T00 has been decoded as mentioned above, it will be understood that the bit data strings which are subsequently inputted by the arrow (2)' are used for decoding from T01.

Since the first three bits which are inputted for decoding the block T01 are equal to "000", it will be understood that the conversion coefficient in which "1" exists at the fifth to third bits of T01 does not exist. Therefore, the conversion coefficients in the block T01 are decoded as 0. Similarly, T02 and T03 are also processed and the conversion coefficient 0 is decoded in the block.

Further, T1 to T3 are also decoded from the bit data string of the arrow (3)' and the conversion coefficient "0" is decoded in the block.

The above operations are also similarly executed even in case of decoding the map E encoded as a binary image. In this case, however, the above operations differ from in that the initial value of T is set for the whole block and that $n_{max}$ is initialized to 0 in a manner similar to the case of encoding and the bit of the positive/negative sign is not included. The details of the decoding process are omitted because it is sufficient to merely perform the process opposite to the encoding process.

The decoded conversion coefficient corresponding to each block as mentioned above is outputted to the switching unit 6.

On the basis of information showing whether the decoded conversion coefficient which is inputted from the header information analyzing unit 8 has been encoded as a multivalue image or encoded as a binary image, the switching unit 6 in FIG. 8 outputs the block of the decoded conversion coefficient to an inverse discrete wavelet conversion unit 10 or an inverse prediction conversion unit 11.

A case where the decoded conversion coefficient has been encoded as a multivalue image will now be described hereinbelow.

The inverse discrete wavelet conversion unit 10 combines the subbands which were decoded and inputted to the original block construction shown in FIG. 4B and inversely converts to the value before the filtering process is executed in FIG. 4A. Although the inverse conversion is realized by repetitively performing the up-sampling and the filtering processes of the low pass filter and the high pass filter, the filter coefficients in this instance satisfy the reconstructing condition for those used upon encoding. For example, for the filters shown in the equations (4) and (5), the image data string x is calculated from $$x(2n)=r(n)+<<(p(n)+1)/2>> \quad (10)$$

$$x(2n+1)=r(n)-<<(p(n))/2>> \quad (11)$$

where, <<X>>: the maximum integer which does not exceed X
by assuming that $$p(n)=d(n-1)-<<(-r(n-1)+r(n+1))/4>> \quad (12)$$

Thus, the conversion coefficients in the block are inversely converted to the multivalue image data and are sequentially outputted to a block synthesizing unit 12.

On the other hand, the case where the decoded conversion coefficient has been encoded as a binary image will now be described.

In this case, each decoded conversion coefficient comprising one bit is inputted as a prediction error map E. The inverse prediction conversion unit 11 sequentially inputs the prediction errors e constructing the map E and decodes the pixel values by using the same template as that shown in FIGS. 6A and 6B and the pixel values which have already been decoded. The detailed description are omitted here since it is sufficient to merely perform the process opposite to the foregoing encoding process. The decoded binary image is converted into the multivalue image and becomes multivalue image data.

The block synthesizing unit 12 synthesizes the block of the multivalue image data which is inputted from the inverse discrete wavelet conversion unit 10 and the block of the multivalue image data which is inputted from the inverse prediction conversion unit 11, thereby decoding the original image data and outputting it.

According to the above embodiment, in the case where the area to be encoded as a multivalue image and the area to be encoded as binary image data mixedly exist in the image shown by the multivalue image data that is inputted, the data can be efficiently encoded. That is, a redundancy of a space area which the original image has is removed, thereby spatially deviating the data. The conversion coefficients which are derived by the discrete wavelet conversion as a multivalue image and the prediction conversion as a binary image can be concentrated to the positions which are spatially deviated. Therefore, the subsequent area dividing unit 4 can divide the conversion coefficients into the partial significant coefficients and the other many insignificant coefficients. Thus, an amount of bit data which is outputted from the area dividing unit 4 can be reduced.

Although the above embodiment has been described on the assumption that a resolution of the image which is decoded from the final encoded data is the same as that of the original image, it is also possible to perform what is called a progressive encoding such that upon decoding, the original image is first decoded at a low resolution and, subsequently, it can be decoded at a high resolution.

In the following second embodiment, a case of constructing the first embodiment so that the progressive encoding can be performed will now be described.

Even in the second embodiment as well, a fundamental construction is similar to that of the first embodiment and the encoding is executed by using the construction of FIG. 1. The detailed description of each unit, therefore, is omitted here.

The second embodiment differs from the first embodiment in a constructing method and a transmitting order of the encoded data (bit data string).

Figure 10:
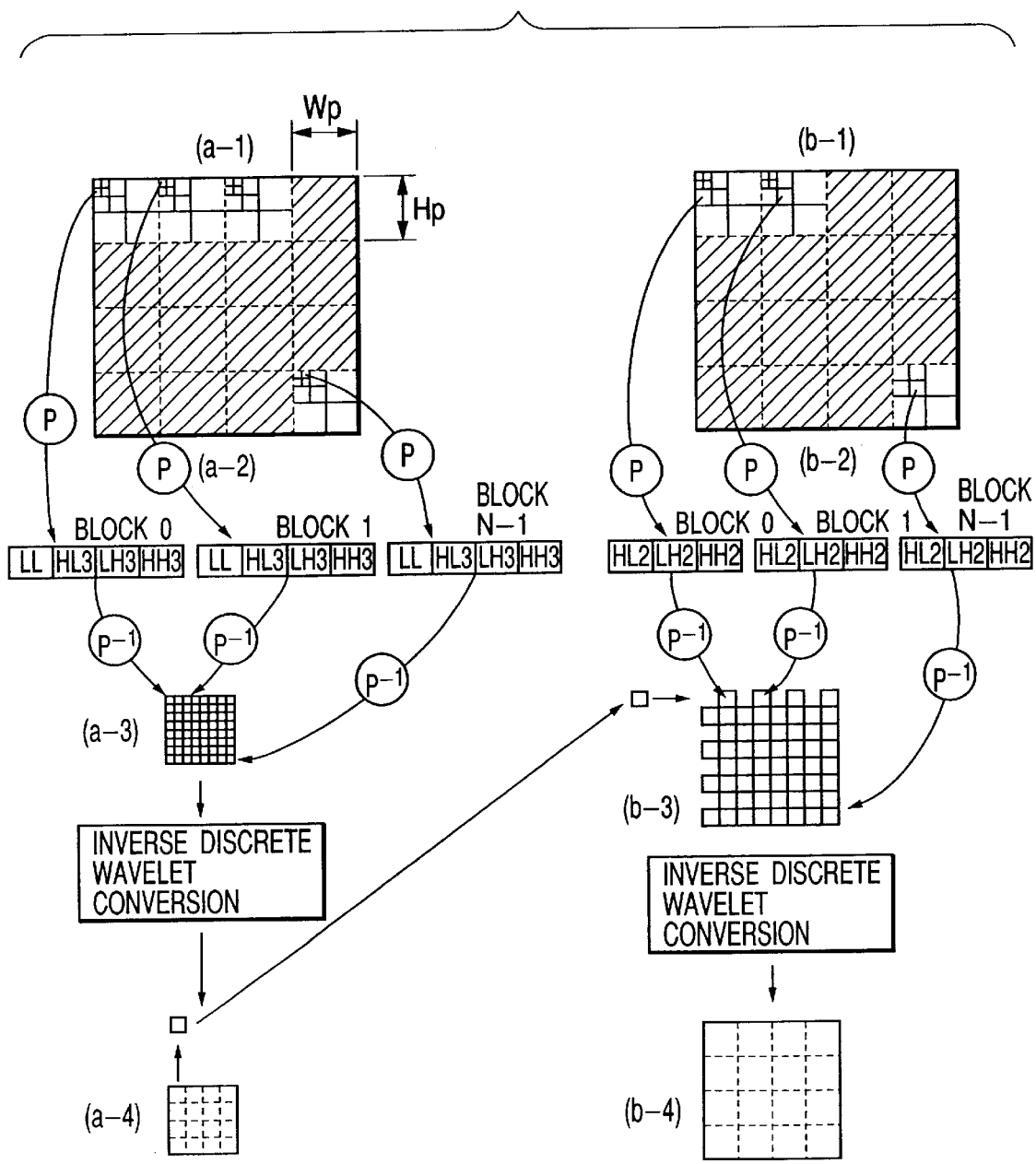
FIG. 10 is an explanatory diagram of progressive encoding and decoding of a multivalue image.

FIG. 10 shows a construction of the bit data string corresponding to each subband in case of encoding as a multivalue image.

A block (a-1) in FIG. 10 shows 16 blocks (blocks of (Wb×Hb) surrounded by broken lines) divided by the block division unit 7. Each of the hatched blocks is a block which is encoded as a binary image and the remaining blocks are blocks which are encoded as multivalue images. The block (a-1) shows a state after it was already discrete wavelet converted. That is, the smallest block in each (Wb×Hb) block corresponds to the subband LL.

In the first embodiment, as shown in FIG. 7D, the subbands LL to HH1 in one block are combined to one block. In the embodiment, however, the subbands are combined on a unit basis of each level "LL, HL3, LH3, HH3" (assumes level 3), "HL2, LH2, HH2" (assumes level 2), and "HL1, LH1, HH1" (assumes level 1) after the discrete wavelet conversion. For example, in the block (a-1), by performing an area dividing operation P, the bit data string in which only the subbands at the discrete wavelet conversion level 3 were encoded is extracted and outputted (a-2).

The decoding side which inputs the bit data string at level 3 performs an area dividing operation $P^{-1}$ at the time of decoding to each bit data string, decodes the coefficients, combines them to one, and constructs an area in which only the coefficients at level 3 of the discrete wavelet conversion are collected (a-3). By performing the inverse discrete wavelet conversion every block, an image obtained by reducing the original image into ¼ in the vertical and lateral directions can be decoded.

Subsequently, on the encoding side, as shown in (b-1), by performing the area dividing operation P, the bit data string in which only the subbands at level 2 were encoded is extracted and outputted (b-2). The decoding side which inputs the bit data string at level 2 constructs an area of the conversion coefficients as shown in (b-3). Since the data at conversion level 3 has already been decoded like (a-4), it is used together with each block comprising level 2 and the inverse discrete wavelet conversion is performed. Thus, an image having the resolution or size that is twice as large as that of the image decoded in (a-4) can be decoded (b-4).

Subsequently, on the encoding side, the bit data string in which only the subbands at level 1 were encoded is outputted. On the decoding side as well, by executing processes similar to those mentioned above, an image having the same resolution or size as that of the original image can be finally decoded.

Although the case of encoding as a multivalue image has been described above, a case of encoding as a binary image can be also progressively encoded.

Figure 11A:
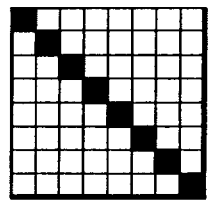
FIGS. 11A, 11B and 11C are explanatory diagrams of a progressive encoding of a binary image.
Figure 11B:
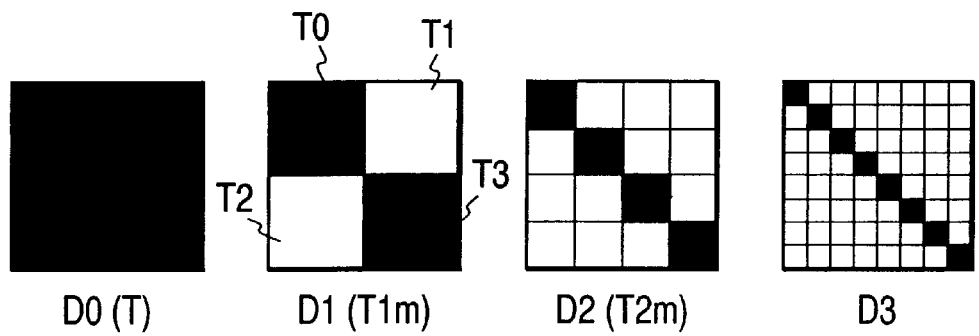
Figure 11C:
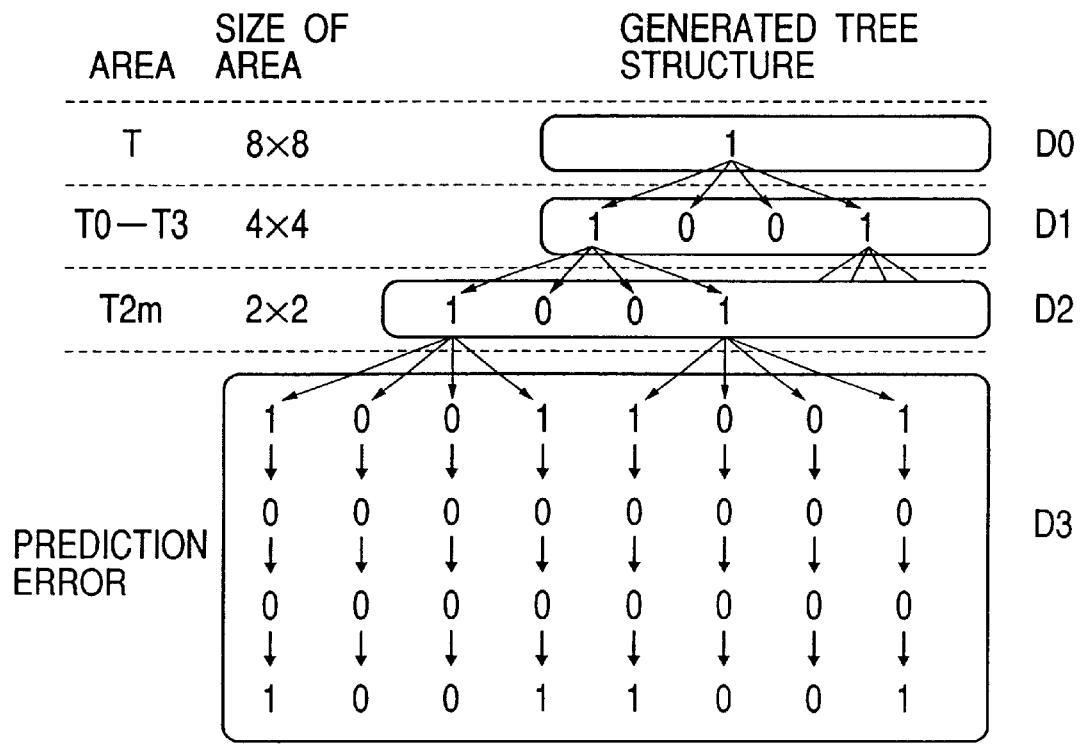

FIGS. 11A to 11C are diagrams for explaining the above method.

FIG. 11A shows the map E comprising the prediction error outputted from the prediction conversion unit 3. A result obtained by converting the map E to the bit data string by the area dividing unit 4 is shown in FIG. 1C. FIG. 11B shows a change in which the initial subject block T is divided.

In FIGS. 11A and 11B, a portion where the prediction error is equal to 1 is shown by a black area. A bit data forming method for performing the progressive encoding will now be described hereinbelow.

The subject block T in the initial state is constructed by (8×8) pixels. Whether the significant conversion coefficient (prediction error "1") exists in the block T or not is discriminated in step S502 in FIG. 5E. When it is decided that there is the significant conversion coefficient, bit "1" showing that the block T is further divided is outputted. In this state, since the position where the significant conversion coefficient exists in T cannot be determined, it is also possible to consider that all of the prediction errors in T are equal to "1" at this time point. This state is shown by D0(T) at the leftmost position in FIG. 11B.

The size of T is checked in step S507. The area division is performed in step S509 and T is divided into T0 to T3. Further, with respect to the blocks T0 to T3, the processes described in the first embodiment are executed and the blocks (T0 and T3 in this case) which were decided to be significant are further divided into small blocks. By recursively performing the above dividing process, a state of D3 in FIGS. 11B and 11C, namely, the bit data string to decode the resolution or size of the original image can be formed.

In the embodiment, different from the processes shown in the flowchart of FIG. 5E, the bit data is not actually outputted in steps S506 and S503. In place of it, a tree structure of the bits as shown in FIG. 11C is formed. In FIG. 11C, although there is no branch in the portion written as a prediction error, this is because since the area reached the minimum size, the division is not performed and the bit data itself of the prediction error is formed.

The output from the area dividing unit 4 to the entropy encoding unit 5 is performed by using a node of a predetermined depth in the tree structure as a unit, namely, by using the portion surrounded by a frame in FIG. 11C as each unit. Now, assuming that those portions are labelled as D1 to D3, a structure of the bit data string which is formed is as shown in FIGS. 12A to 12D.

Figure 12A:
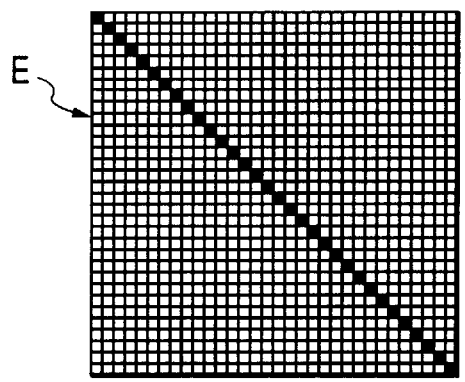
FIGS. 12A, 12B, 12C and 12D are explanatory diagrams of a progressive decoding of a binary image.
Figure 12B:
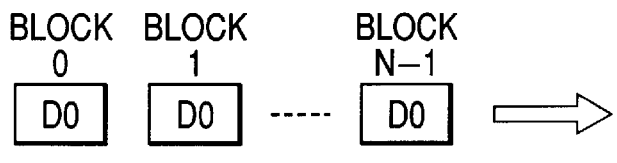
Figure 12B:
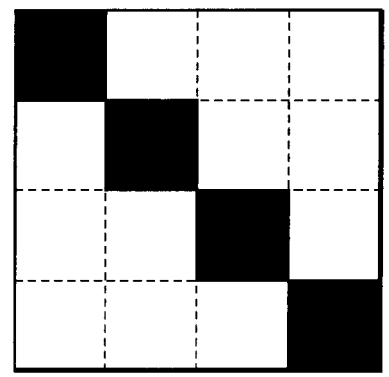

FIG. 12B shows a state when D0 corresponding to each block divided by the block division unit 7 is first outputted to the decoding side. By decoding only D0, a map E as shown in the diagram is formed. Each of the blocks surrounded by broken lines shown here corresponds to each block divided by the block division unit 7.

In case of decoding only D0, each block surrounded by the broken lines can express only either black or white and an image of a very low resolution is decoded.

Figure 12C:
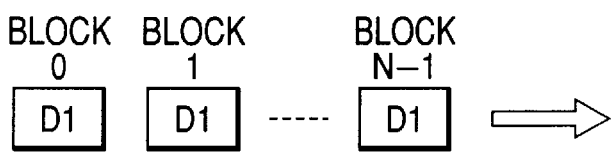
Figure 12C:
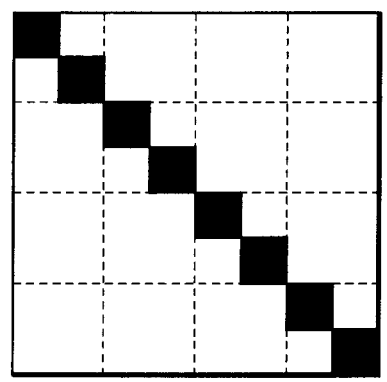

Subsequently, D1 is outputted from the encoding side. On the decoding side, an image as shown in FIG. 12C can be decoded on the decoding side from both of D1 and D0 which was first inputted.

Figure 12D:
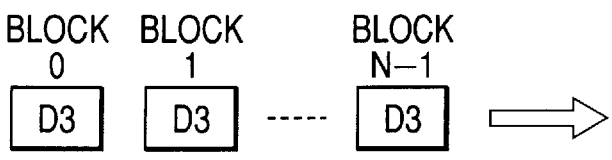
Figure 12D:
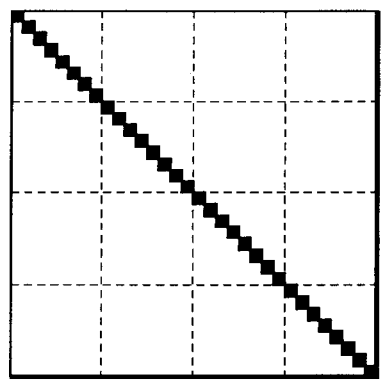

Similarly, by sequentially inputting D2 and D3, the decoded image sequentially changes from the low resolution to the high resolution and the original image as shown in FIG. 12D can be finally decoded.

As mentioned above, according to the second embodiment, not only the effect of the first embodiment can be obtained but also the progressive encoding such that the decoded image on the decoding side is sequentially changed from the low resolution to the high resolution can be executed. Even if there is only small encoded data on the decoding side, the outline of the original image can be grasped.

The invention can be applied to not only the case of switching the binary value and multivalue and encoding but also the case of switching N values and M values and encoding.

Not only the case of automatically discriminating the image data by the discrimination unit 1 in FIG. 1 but also the case of manually switching the switching unit 6 is included in the invention.

The invention can be applied to a system in which each unit necessary for the encoding and decoding processes is connected and used or can be also applied as one equipment.

A third embodiment of the invention will now be described hereinbelow with reference to the drawings.

Figure 13:
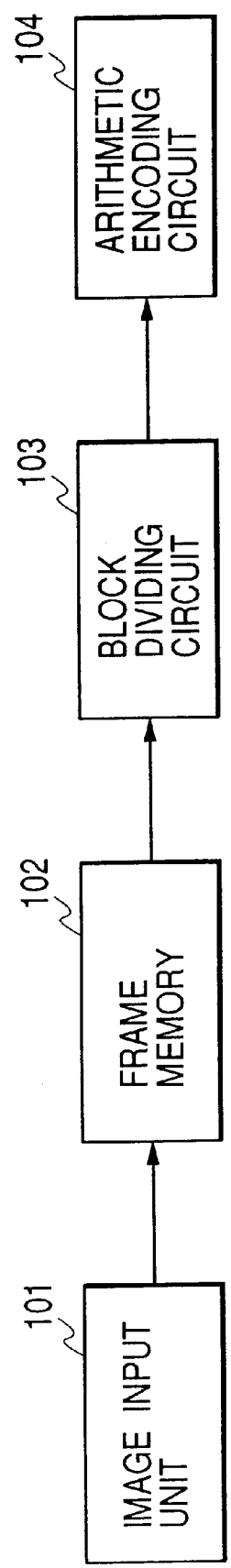
FIG. 13 is a block diagram according to the third embodiment.

FIG. 13 shows an image processing apparatus to execute the third embodiment of the invention. In the diagram, reference numeral 101 denotes an image input unit; 102 a frame memory to store the whole image (picture plane) to be encoded; 103 a block dividing circuit; and 104 an arithmetic encoding circuit.

In the embodiment, what is called a binary image such that "0" assumes a pixel value of a background and "1" assumes a pixel value of a foreground is encoded.

The operation of each unit in the embodiment will now be described in detail hereinbelow.

First, all of the pixel data (1 or 0) showing the image (corresponding to one picture plane) as an encoding target is sequentially inputted from an image input unit in accordance with the raster scanning order and is stored into the frame memory 102.

The image input unit is, for example, an image pickup apparatus such as scanner, digital camera, or the like, an interface of a network line, or the like.

The block dividing circuit 103 divides the image of one picture plane comprising the pixel data stored in the frame memory 102 into a plurality of blocks by using a characteristic block dividing method such that blocks of different sizes mixedly exist.

The block dividing method will now be described in detail hereinbelow with reference to the drawings.

According to the block division, an image of one picture plane to be encoded is extracted every block (explained as (4×4) pixels in the embodiment) of a predetermined size and this block is further recursively divided into four blocks on the basis of a pixel distribution, thereby forming small blocks.

By the bit data string obtained after completion of the dividing process, a reversible encoding such that the arrangement of the background pixels and the foreground pixels can be perfectly expressed can be realized.

A procedure of the dividing process will be first explained.

Figure 14:
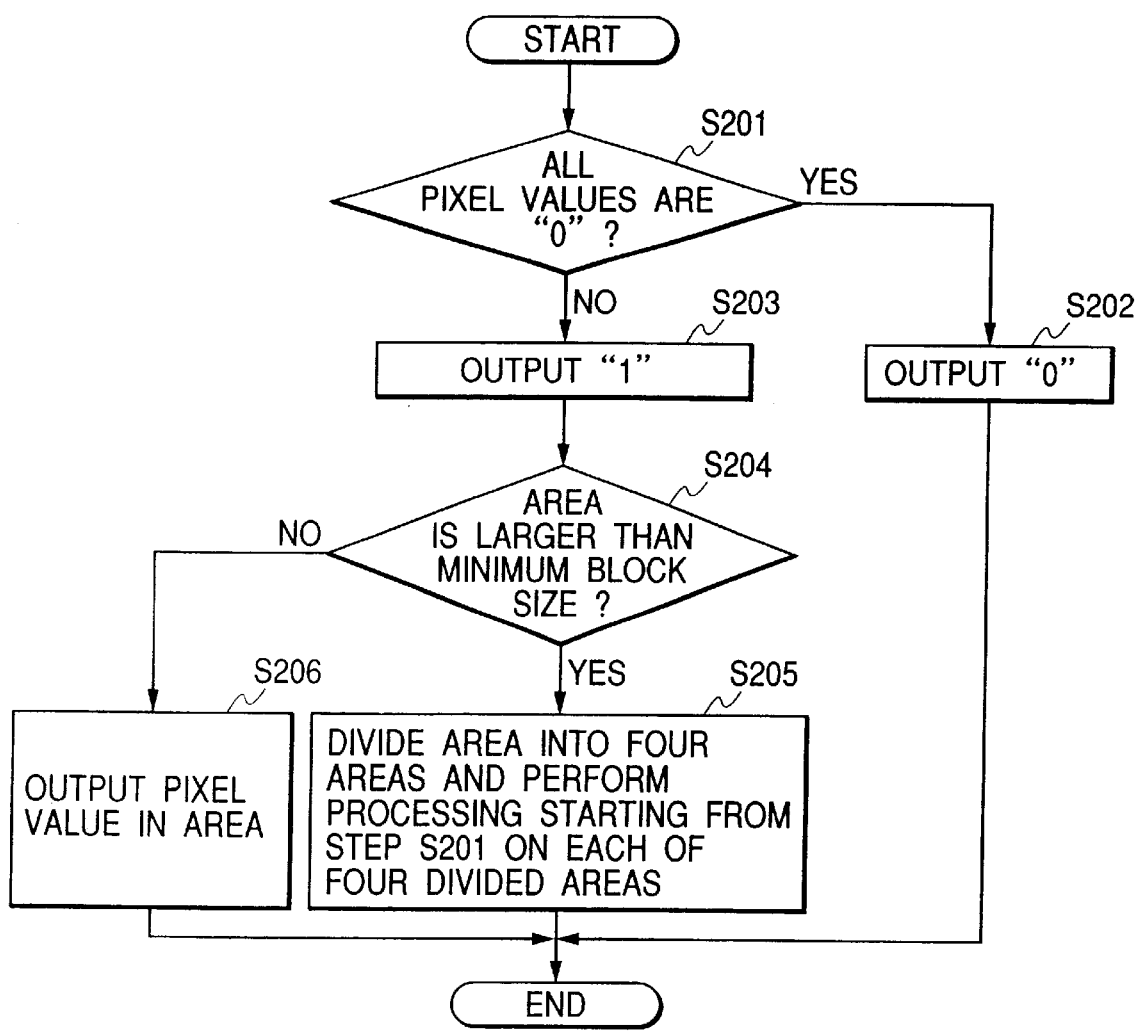
FIG. 14 is a diagram sowing a flow of processes of a block dividing circuit 103.

FIG. 14 is a flowchart showing a flow of processes of the block dividing circuit 103.

First in step 201, the image of one picture plane stored in the frame memory 102 is read out on a block unit basis. That is, prior to performing the block division, while the image is previously divided into blocks of a predetermined size (4×4 pixels) by a block dividing circuit at the post stage, the image data is sequentially read out. The block dividing circuit 103 further performs the block division every read-out block of (4×4) pixels.

FIG. 15A shows a state of a certain block among the blocks of (4×4) pixels which are sequentially read out. This certain block is referred to as a subject block hereinafter and explanation will be made by using the subject block.

First in step 201, a check is made to see if all of the pixels in the subject block are set to background "0". That is, whether there is no foreground "1" in the subject block of (4×4) pixels or not is discriminated.

Thus, if all of the pixels are equal to "0", step 202 follows. When any one of the pixels is equal to "1", step 203 follows.

In step 202, bit "0" showing that the original block of (4×4) pixels is not divided any more is outputted as an intermediate code and the dividing process of the subject block is finished.

On the other hand, in step 203, bit "1" showing that the block is divided is outputted as an intermediate code. In step 204, when a size of subject block is larger than the predetermined smallest size (the block of (2×2) pixels is set to the minimum block in the embodiment), step 205 follows. If NO, step 206 follows.

The set size of minimum block can be manually changed.

Figure 20:
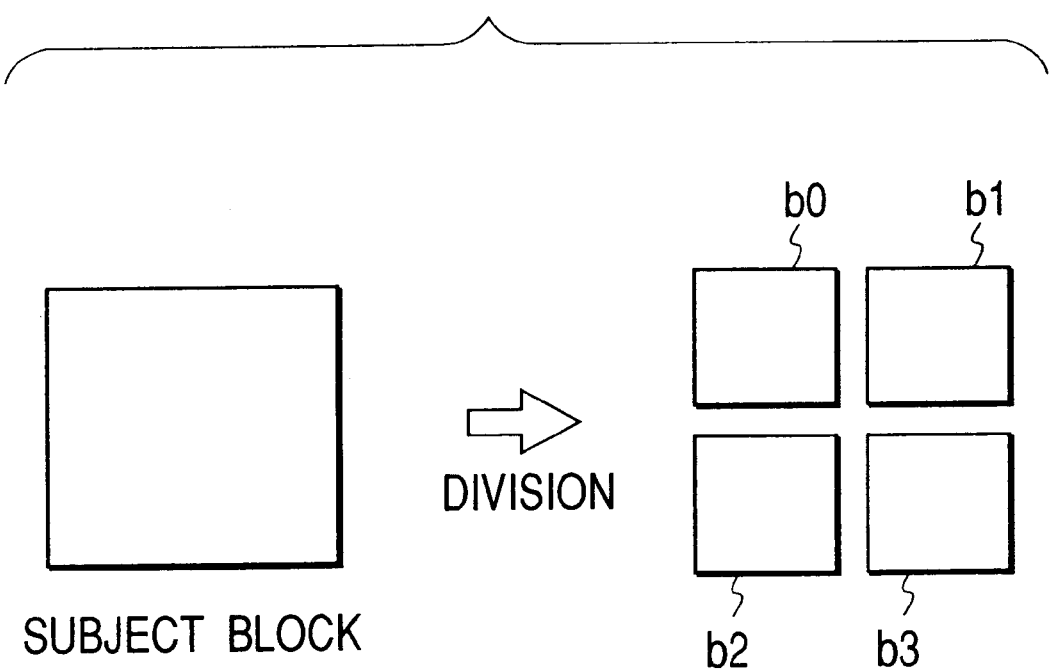
FIG. 20 is a diagram showing a state where a block is further divided by the block dividing circuit 505.

In step 205, as shown in FIG. 20, the subject block is divided into four blocks b0 to b3 (in order to distinguish from the original block of (4×4) pixels, these four blocks of (2×2) pixels are called subblocks). With respect to each of the subblocks b0, b1, b2, and b3 formed here as well, the dividing process is executed in accordance with the procedure from step 201 in a manner similar to the foregoing block of (4×4) pixels.

In step 206, the pixel values (2×2 pixels in the embodiment) in the block are sequentially scanned and either "1" or "0" is outputted.

In FIG. 15A, a white pixel indicates a background pixel, namely, a pixel of a value "0" and a black pixel shows a foreground pixel, namely, a pixel of a value "1". Specific dividing processes of the block dividing circuit 103 for the subject block will now be described hereinbelow.

First, as for the subject block (refer to FIG. 15A), since it is determined in step 201 that all of the pixels in the block are not equal to "0", "1" is outputted as an intermediate code showing the information of the block division (step 203). Since it is decided in step 204 that the size of subject block of (4×4) pixels is larger than the size of (2×2) pixels by comparing it with the minimum block size, the processing routine advances to step 205.

In step 205, the subject block is divided into four subblocks b0, b1, b2, and b3 of (2×2) pixels as shown in FIG. 15B. The block dividing processes from step 201 are further executed with respect to each of the subblocks b0, b1, b2, and b3.

Since all of the pixel values in each of the subblocks b0, b1, and b2 are equal to "0", the processing routine advances to step 202 as a result of discrimination in step 201. The intermediate code "0" is outputted as information of division for each of the subblocks b0, b1, and b2. After that, the dividing processes of those three blocks are finished.

On the other hand, as for the subblock b3, since all of the pixels in the block are not equal to "0", "1" is outputted as an intermediate code showing the information of the block division (step 203). After that, since the size of subblock b3 is equal to the minimum block size of (2×2) pixels in step 204, the processing routine advances to step 206. In step 206, the block is divided every pixel and four pixel values "0", "1", "1", and "1" in the block are also outputted as intermediate codes.

By executing the above dividing processes, a bit data string "100010111" as shown in FIG. 16 is outputted as an intermediate code corresponding to the subject block of (4×4) pixels shown in FIG. 15A. It can be said that the first, second, third, fourth, and fifth bits of the bit data string are division information indicating whether the block has been divided or not.

When the subject block is decoded from the intermediate code on the decoding side, it is first known from first bit "1" that the subject block has been divided into the blocks of (2×2) pixels and it is known from subsequent bits "0", "0", and "0" that all of the pixels of the first three subblocks b0 to b2 are equal to "0", so that they can be decoded. It is known from subsequent bit "1" that only the subblock b3 has been further divided. Since the subblock b3 is the minimum block, it is known that subsequent bits "0", "1", "1", and "1" are the actual pixel values. All of the pixels are decoded.

The above intermediate code is a reversible code which certainly shows at which position in the subject block the significant pixel "1" exists and at which position "0" exists.

The intermediate code which is outputted from the block dividing circuit 103 is arithmetically encoded by the arithmetic encoding circuit 104. In the embodiment, QM-Coder is used as a method of arithmetic encoding.

When the QM-Coder is used, a procedure for adaptively encoding a binary symbol b of "1" or "0" generated in a certain status S in accordance with the status S has been described in detail in the International Standard ITU-T T.81|ISO/IEC 10918-1 Recommendation or the like about a still image. Therefore, its description is omitted here. As a method of classifying the status S, a method of using statuses of peripheral pixels of a binary encoding pixel or the like is known.

According to the embodiment, however, the intermediate code indicative of the information of the block division is encoded instead of merely encoding the pixel values of the binary image and this method is a peculiar method different from the well-known method. Therefore, the classifying method of the status S will be described in detail.

In the binary intermediate code which is outputted from the block dividing circuit 103, the block division information (bit showing whether the block is further divided into subblocks or not) and the actual pixel values (last four bits "0", "1", "1", "1" in FIG. 16) in the block after completion of the dividing process mixedly exist. The arithmetic encoding circuit 104 classifies those two bits into different statuses and encodes. Particularly, as for the bit indicative of the block division information, the arithmetic encoding according to the detailed status S is executed in consideration of the block dividing situation of the peripheral blocks.

A case of arithmetically encoding the bit of the block division information as a feature of the invention will now be described in detail hereinbelow.

As described in the operation explanation of the block dividing circuit 103, the block division information shows whether a predetermined block is divided or not. If the blocks (refer to FIG. 15A) which are first sequentially read out are excluded, the blocks become the subblocks of the other blocks (blocks before the division). In the embodiment, the arithmetic encoding is efficiently executed in consideration of the above point.

Specifically speaking, in case of arithmetically encoding the block division information of the subblock, the status S is classified in accordance with the position (the same position as that of any one of b0, b1, b2, and b3) of the subblock and the number of divided subblocks among the other subblocks which are included in the original block before division and have already been divided (for example, b0 in case of the subblock b1; b0 and b1 in case of the subblock b2; b0 to b2 in case of the subblock b3; none in case of the subblock b0).

For example, when the block division information ("0" in the embodiment) of the subblock b0 is arithmetically encoded, the other subblocks which are included in the block (subject block in FIG. 15A in the embodiment) before it is divided into this subblock and have already been divided do not exist. Therefore, the block division information of the subblock b0 is arithmetically encoded as a status S(1). A status S(n) indicates the nth status.

When the block division information ("0" in the embodiment) of the subblock b1 is arithmetically encoded, the other subblocks which are included in the block (subject block in FIG. 15A in the embodiment) before it is divided into this subblock and have already been divided are only one subblock b0. Therefore, the statuses can be classified into two statuses S(2) and S(3) indicating whether the subblock b0 has been divided or not (namely, whether the block division information of b0 is equal to "1" or "0"). Thus, when the block division information of the subblock b2 is arithmetically encoded, the arithmetic encoding is executed on the basis of either one of the statuses S(2) and S(3).

When the block division information ("0" in the embodiment) of the subblock b2 is arithmetically encoded, the other subblocks which are included in the block (subject block in FIG. 15A in the embodiment) before it is divided into this subblock and have already been divided are the two subblocks b0 and b1. Therefore, the statuses can be classified into four statuses S(4) to S(7) showing whether the subblocks b0 and b1 have been divided or not (namely, whether the block division information of b0 and b1 is equal to "1" or "0"). Consequently, when the block division information of the subblock b2 is arithmetically encoded, the arithmetic encoding is performed on the basis of any one of the statuses S(4) to S(7).

When the block division information ("1" in the embodiment) of the subblock b3 is arithmetically encoded, the other subblocks which are included in the block (subject block in FIG. 15A in the embodiment) before it is divided into this subblock and have already been divided are the four subblocks b0 to b3. Therefore, the statuses can be classified into eight statuses S(8) to S(15) showing whether the subblocks b0 to b3 have been divided or not (namely, whether the block division information of b0 to b3 is equal to "1" or "0"). Consequently, when the block division information of the subblock b3 is arithmetically encoded, the arithmetic encoding is performed on the basis of any one of the statuses S(8) to S(15).

In the statuses S(1) to S(15) which were individually divided as mentioned above, the intermediate codes are sequentially arithmetically encoded by the QM-Coder. In the QM-Coder, an appearance probability of the next symbol is presumed from the encoded symbol string every status S and the encoding is executed in accordance with the appearance probability of the symbol in each status.

The encoding of the binary image data can be efficiently executed by the above processes.

Although the system of encoding the binary image data has been provided in the above third embodiment, the invention is not limited to it. That is, as for a point that the efficient arithmetic encoding is executed in consideration of the image dividing process, particularly, it is not always necessary to perform the encoding of the binary image data. The invention can be also applied to the case of encoding multivalue image data. Such a modification will now be described as a fourth embodiment of the invention hereinbelow.

Figure 17:
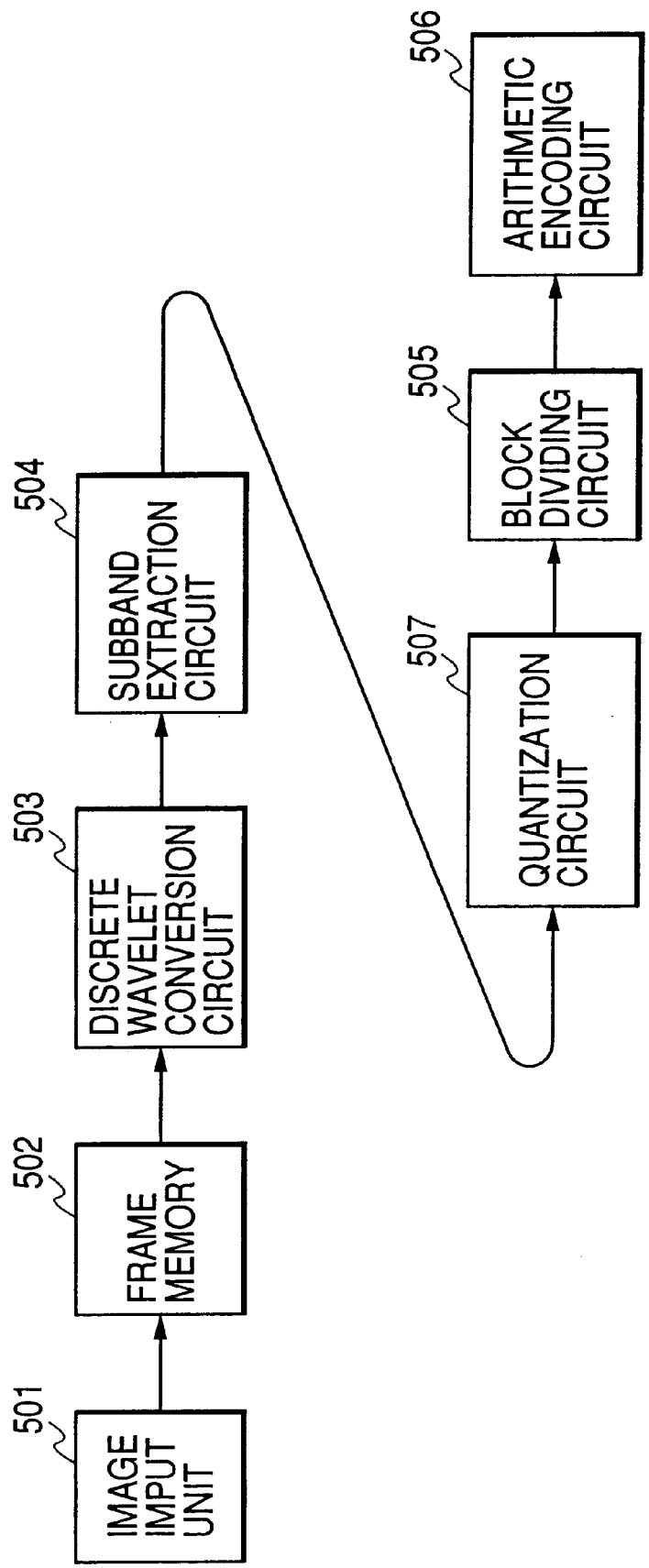
FIG. 17 is a diagram showing a block diagram in the fourth embodiment according to the invention.

FIG. 17 shows a block diagram of the fourth embodiment according to the invention. In the diagram, reference numeral 501 denotes an image input unit to input multivalue image data of one picture plane and 502 indicates a frame memory to store the multivalue image data of one picture plane. In a manner similar to the third embodiment, the image input unit 501 is, for example, an image pickup apparatus such as scanner, digital camera, or the like, an interface such as a network line, or the like.

Reference numeral 503 denotes a discrete wavelet conversion circuit to discrete wavelet convert multivalue image data; 504 a subband extraction circuit to sequentially extract a plurality of subbands generated by the discrete wavelet conversion; 505 a block dividing circuit for performing a process similar to that of the block dividing circuit 103 in FIG. 1; and 506 an arithmetic encoding circuit.

In the embodiment, explanation will be made on the assumption that monochromatic multivalue image data of 8 bits is encoded. However, the invention is not limited to such an example. A case where the invention is applied to a color multivalue image encoding such that 8-bit multivalue image data is encoded as a luminance L and 8-bit multivalue image data is encoded as chromaticities a and b is also incorporated. The invention is not limited to the image data but the invention can be also applied to a case of encoding multivalue information showing the status of each pixel of an image area.

First, multivalue image data to be encoded is inputted from the image input unit 501 and stored into the frame memory 502. The discrete wavelet converting circuit 503 reads out the multivalue image data of one picture plane stored in the frame memory 502 every block of a predetermined size and sequentially executes the discrete wavelet conversion. By the discrete wavelet conversion, the original block is divided into a predetermined number of frequency bands (hereinafter, called subbands) as shown in FIGS. 18A to 18C. The discrete wavelet conversion for image data string x(n) in the embodiment is executed by the following equations.

$$r(n) = <<(x(2n)+x(2n+1))/2>> \quad d(n) = x(2n)-x(2n+1)$$

where, $<<X>>$: the maximum integer which does not exceed x $r(n)$, $d(n)$: conversion coefficients $r(n)$: low frequency component $d(n)$: high frequency component Although the above conversion equations relate to one-dimensional data, by sequentially executing the conversion in the horizontal direction and the vertical direction, the original block can be divided into four subbands of LL, HL, LH, and HH as shown in FIG. 18A.

Further, by again performing the discrete wavelet conversion to the LL component, the block is divided into seven subbands as shown in FIG. 18B. The number of times of execution of the two-dimensional discrete wavelet conversion is called a level number. It is assumed that each subband is expressed and specified as shown by LH3 (LH component at level 3) by adding the level number to LL, HL, LH, and HH showing the components. In the embodiment, the conversion at level 4 is performed and the block is divided into 13 subbands shown in FIG. 18C.

The subband extraction circuit 504 sequentially extracts only specific bands such as LL4, HL4, LH4, HH4, HL3, LH3, . . . , HH1 from the conversion coefficient data divided into 13 subbands by the discrete wavelet conversion circuit 503 in accordance with the order from the low frequency band and outputs them to a quantization circuit 507 at the post stage.

In the quantization circuit 507, the values of all of the conversion coefficients in each of the subbands which are sequentially outputted by the subband extraction circuit 504 are divided by a predetermined quantization coefficient, thereby performing the quantization. In the embodiment, 2 is used as a quantization coefficient.

The block dividing circuit 505 recursively executes the block dividing process similar to that in the third embodiment with reference to the values of the conversion coefficients in each subband quantized by the quantization circuit 507. This method will be explained hereinlater.

As a result of division mentioned above, the intermediate code is formed by outputting the information showing the block division and a value (positive/negative signs and the absolute value) of the conversion coefficient of the block whose size is equal to or smaller than the predetermined minimum size (assumes (2×2) pixels in the embodiment).

The block dividing process in the embodiment will now be described.

In the block division of a binary value in the third embodiment, whether the block as a target is divided or not is determined on the basis of the presence or absence of the significant pixel "1" in the block. However, the deciding method is almost the same in terms of this point. Specifically speaking, whether the block is further divided into four sub-subblocks or not is determined by checking whether a pixel of a certain predetermined density (bit plane of a predetermined height) or more exists in the block or not. In case of the block division of a binary value, when the size of subblock after the repetition of the division becomes the minimum size, the actual pixel values "1" and "0" in the subblock are generated. In the embodiment, however, multivalue bit data is outputted. Explanation will now be made hereinbelow with reference to the drawings.

Figure 19:
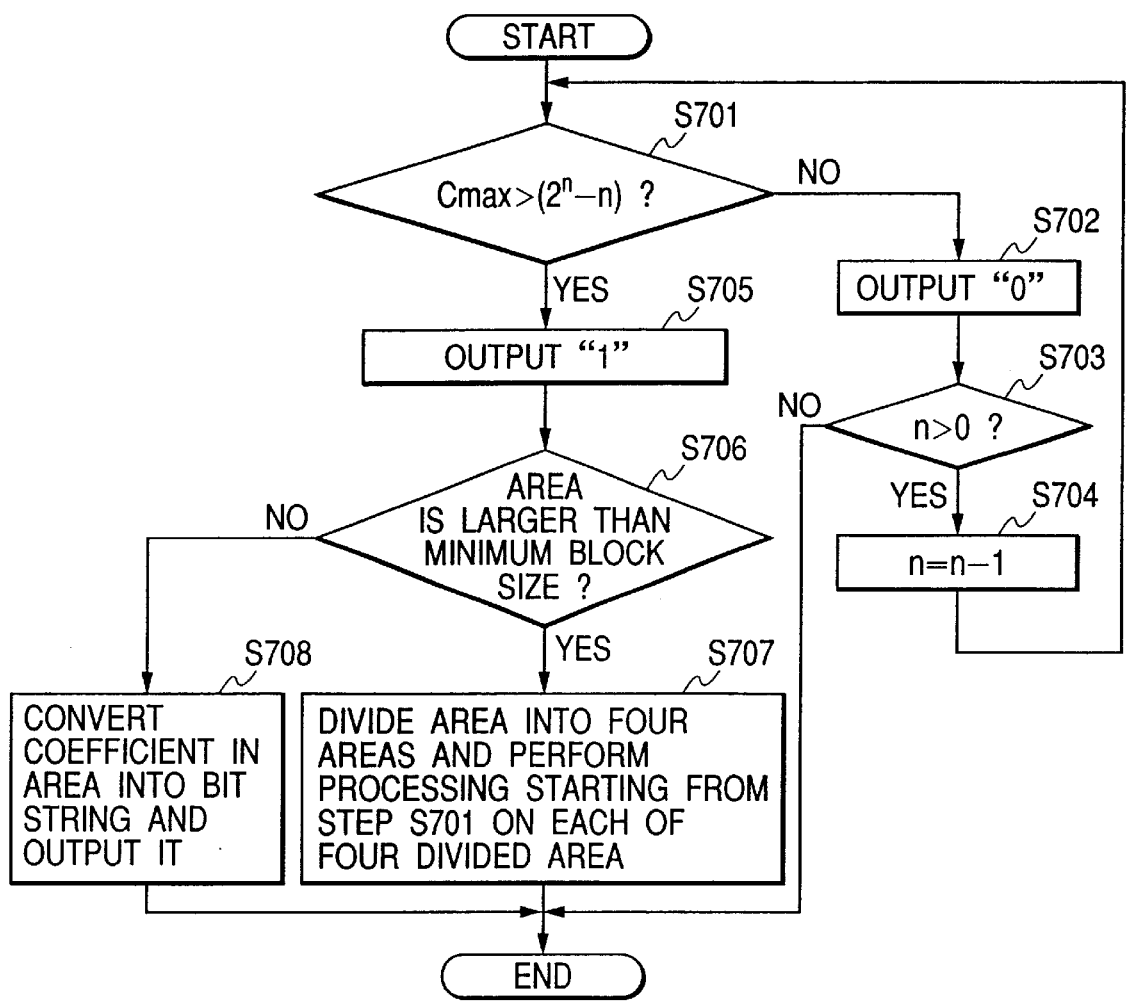
FIG. 19 is a diagram showing a flow for processes of a block dividing circuit 505.

FIG. 19 shows a flow of dividing process of a multivalue block which is executed by the block dividing circuit 505. Processes of the block dividing circuit 505 will now be sequentially explained hereinbelow with reference to the diagram.

Prior to the block dividing process by the block dividing circuit 505, an initial value of the number n of the subject bit plane is set. It is assumed that the bit plane number is set to 0 for the LSB plane and increases one by one toward the MSB plane.

The initial value of the subject bit plane number n is set to the theoretical maximum bit number necessary to express an absolute value of the conversion coefficient in the subband inputted to the block dividing circuit 505. This number is determined by the number of bits per pixel of an image to be encoded, the number of bits after completion of the wavelet conversion, and further, the number of bits after the quantization.

In case of the embodiment, the multivalue image to be encoded is expressed by 8 bits per pixel. The numbers of bits of the absolute values of the conversion coefficients which are derived by the converting process of the discrete wavelet conversion circuit 503 differ depending on the components and are set to 8 bits for the LL, HL, and LH components and to 9 bits for the HH component.

Since the subband is further divided by the quantization coefficient 2 by the quantization circuit 507, the initial value of n is set to 7 bits for the LL, HL, and LH components and to 8 bits for the HH component.

The block dividing circuit 505 first sets the whole subbands extracted by the subband extraction circuit 504 to a processing target block (subject block). First in step 701, the maximum value $C_{max}$ of the absolute values of the coefficients in the subject block is obtained and is compared with a threshold value $2^n-1$ which is determined from the number n of subject bits. When $C_{max}$ is larger than the threshold value, step 705 follows. If NO, the processing routine is returned to step 702.

That is, this is equivalent to that the absolute values of the conversion coefficients in the processing subject block are natural binary expressed and divided into bit planes and whether all of the subject bit planes are equal to "0"or not is discriminated. In step 702, "0"showing that the block is not divided in the relevant bit plane is outputted as an intermediate code as information of the block division.

In step 703, the value of n is examined. When n is larger than 0, the processing routine advances to step 704. If NO, the processes about the subject block are finished. In step 704, the value of n is reduced by "1" and the processing routine is returned to step 701.

In step 705, the intermediate code "1" showing that the block has been divided is outputted as information of the block division. In step 706, the size of subject block is compared with the predetermined minimum block size. When the subject block size is larger than the minimum block size, step 707 follows. If NO, the processing routine advances to step 708.

In step 707, the subject block is divided into four subblocks and the initial value of the subject bit plane number is set to the present value of n with respect to each of the subblocks. The processes from step 701 are executed.

In step 708, the absolute values are natural binary expressed by n bits and are outputted from the upper bit one by one in accordance with the raster scanning order with regard to the coefficients in the subject block. If the coefficient value is not equal to "0", the positive/negative sign ("0" if "+"; "1" if "−") is also outputted.

By the above processes, each of the subbands inputted to the block dividing circuit 505 is converted into the intermediate code and outputted.

The arithmetic encoding circuit 506 arithmetically encodes the intermediate codes which are outputted from the block dividing circuit 505 and outputs the final encoded data. In the embodiment as well, it is assumed that the arithmetic encoding is performed by using the QM-Coder in a manner similar to the third embodiment.

The details of the processing procedure of the QM-Coder are also omitted here in a manner similar to the third embodiment and only the classifying method of the status S which is used for arithmetic encoding will now be described. The block division information (bit showing whether the block is divided or not) and the multivalue conversion coefficient value (bits showing the absolute values and positive/negative sign) are included in the intermediate code which is outputted from the block dividing circuit 505.

Those information is arithmetically encoded on the basis of the individual statuses S in a manner similar to the third embodiment.

Further, in the embodiment, when the bits to express the absolute values of the conversion coefficients are arithmetically encoded, the status is classified on the basis of the bit plane number to which the bit to be encoded belongs. The status about the block division information is also finely classified. The block is arithmetically encoded in consideration of a fact that except for the subband as a first division target, the block becomes the subblocks of the other blocks (original block before division).

Specifically speaking, in case of arithmetically encoding the block division information of the subblock, the status S is classified in accordance with the position (the same position as that of any one of b0, b1, b2, and b3) of the subblock and the number of subblocks among the other subblocks which are included in the original block before the division and have already been divided (for example, b0 in case of the subblock b1; b0 and b1 in case of the subblock b2; b0 to b2 in case of the subblock b3; and none in case of the subblock b0).

For example, when the block division information of the subblock b0 is arithmetically encoded, the other subblocks which are included in the block before it is divided into this subblock and have already been divided do not exist. Therefore, the block division information of the subblock b0 is arithmetically encoded as a status S(1). The status S(n) indicates the nth status.

When the block division information of the subblock b1 is arithmetically encoded, the other subblocks which are included in the block before it is divided into this subblock and have already been divided are one subblock b0. Therefore, the statuses can be classified into two statuses S(2) and S(3) showing whether the subblock b0 has been divided or not (namely, whether the block division information of b0 is equal to "1" or "0"). Thus, when the block division information of the subblock b2 is arithmetically encoded, the arithmetic encoding is executed on the basis of either one of the statuses S(2) and S(3).

When the block division information of the subblock b2 is arithmetically encoded, the other subblocks which are included in the block before it is divided into this subblock and have already been divided are two subblocks b0 and b1. Therefore, the statuses can be classified into four statuses S(4) to S(7) showing whether the subblocks b0 and b1 have been divided or not (namely, whether the block division information of b0 and b1 is equal to "1" or "0"). Thus, when the block division information of the subblock b2 is arithmetically encoded, the arithmetic encoding is executed on the basis of any one of the statuses S(4) to S(7).

When the block division information of the subblock b3 is arithmetically encoded, the other subblocks which are included in the block before it is divided into this subblock and have already been divided are four subblocks b0 to b3. Therefore, the statuses can be classified into eight statuses S(8) to S(15) showing whether the subblocks b0 to b3 have been divided or not (namely, whether the block division information of b0 to b3 is equal to "1" or "0"). Thus, when the block division information of the subblock b3 is arithmetically encoded, the arithmetic encoding is executed on the basis of any one of the statuses S(8) to S(15).

In the statuses S(1) to S(15) which were individually classified as mentioned above, the intermediate codes are sequentially arithmetically encoded by the QM-Coder. In the QM-Coder, an appearance probability of the next symbol is presumed from the encoded symbol string every status S and the encoding is executed in accordance with the appearance probability of the symbol in each status.

By the above processes, the encoding of the multivalue image data can be efficiently executed.

The invention is not limited to the foregoing embodiments. For example, in the fourth embodiment, although the filter of two taps has been used in the discrete wavelet conversion, another filter of a larger number of taps can be also used. Although the QM-Coder has been used as an arithmetic encoding method, another arithmetic encoding such as Q-Coder, CJ-Coder, or the like can be also used.

The system for entropy encoding the intermediate code is not limited to the arithmetic encoding. For example, a Huffman encoding such that the method is switched in accordance with the status or the like can be also used.

Although the third embodiment has been described on the assumption that an image of one picture plane to be encoded is a mere binary image, the invention is not limited to it. That is, the invention also incorporates a case where it is applied when position information of one picture plane showing the position "1" of a photograph area and the position "0" of a character/diagram area in one picture plane is encoded in place of encoding the binary image of one picture plane.

Although the fourth embodiment has been described on the assumption that the image of one picture plane to be encoded is a mere multivalue image, the invention is not limited to it. That is, the invention also incorporates a case where it is applied when multivalue identification information for each position in one picture plane is encoded in place of encoding the multiimage of one picture plane.

The invention can be applied as a part of a system comprising a plurality of equipment (for example, a host computer, interface equipment, a reader, a printer, and the like) or can be also applied to a part of an apparatus comprising one equipment (for instance, a copying apparatus, a facsimile apparatus).

The invention is not limited to an apparatus and a method for realizing the foregoing embodiments. A case where program codes of software to realize the embodiments are supplied to a computer (CPU or MPU) in the system or apparatus and the computer of the system or apparatus makes the above various devices operative in accordance with the program codes, thereby realizing the embodiments is also incorporated in the scope of the invention.

In this case, the program codes themselves of the software realize the functions of the embodiments. The program codes themselves and means for supplying the program codes to the computer, specifically speaking, a storing medium in which the program codes have been stored are also incorporated in the scope of the invention.

As such a storing medium to store the program codes, for example, it is possible to use a floppy disk, a hard disk, an optical disk, a magnetooptic disk, a CD-ROM, a magnetic tape, a non-volatile memory card, an ROM, or the like.

The program codes are incorporated in the scope of the invention in not only a case where the functions of the embodiments are realized by controlling the various devices by the computer in accordance with only the supplied program codes but also a case where the embodiments are realized in cooperation with the OS (Operating System) by which the program codes operate on the computer, another application software, or the like.

Further, a case where the supplied program codes are stored into a memory provided for a function expansion board of a computer or a function expanding unit connected to the computer and, after that, a CPU or the like equipped for the function expansion board or function expanding unit executes a part or all of the actual processes on the basis of an instruction of the program codes and the embodiments are realized by those processes is also incorporated in the scope of the invention.

The present invention is not limited to the foregoing embodiments but many modifications and variations are possible within the spirit and scope of the appended claims of the invention.

What is claimed is:

1. An image processing apparatus comprising:
   output means for outputting division information showing whether or not each of a plurality of blocks including an encoding subject block has further been divided into a plurality of sub-blocks; and
   entropy encoding means for entropy encoding the division information corresponding to said encoding subject block on a basis of a presumption probability according to a division situation of a neighboring block of said encoding subject block,
   wherein the division information includes a plurality of bits, and represents an existence of one division, of said encoding subject block, by one bit in the plurality of bits of the division information.

2. An apparatus according to claim 1, wherein said entropy encoding is an arithmetic encoding.

3. An apparatus according to claim 1, wherein said output means includes dividing means for further dividing said encoding subject block into a plurality of blocks.

4. An apparatus according to claim 3, wherein said dividing means decides whether said encoding subject block is divided or not in accordance with a result of discrimination about whether a significant coefficient exists in said encoding subject block or not.

5. An apparatus according to claim 1, wherein said encoding subject block is constructed by a plurality of coefficients and each of said coefficients is a binary value.

6. An apparatus according to claim 1, wherein said encoding subject block is constructed by a plurality of coefficients and each of said coefficients is a multivalue.

7. An apparatus according to claim 1, wherein said encoding subject block is one of a plurality of blocks obtained by dividing an initial block at least one or more times.

8. An apparatus according to claim 7, wherein said neighboring block is included in said initial block.

9. An apparatus according to claim 1, wherein said plurality of blocks construct one of subbands derived after completion of a wavelet conversion.

10. An image processing method comprising:
    an outputting step of outputting division information showing whether or not each of a plurality of blocks including an encoding subject block has further been divided into a plurality of sub-blocks; and
    an entropy encoding step of entropy encoding the division information corresponding to said encoding subject block on a basis of a presumption probability according to a division situation of a neighboring block,
    wherein the division information includes a plurality of bits, and represents an existence of one division, of said encoding subject block, by one bit in the plurality of bits of the division information.

11. A storing medium in which an image processing program has been stored in a state where said program can be read out from a computer, wherein said image processing program comprises:
    an outputting step of outputting division information showing whether or not each of a plurality of blocks including an encoding subject block has further been divided into a plurality of sub-blocks; and
    an entropy encoding step of entropy encoding the division information corresponding to said encoding subject block on a basis of a presumption probability according to a division situation of a neighboring block of said encoding subject block,
    wherein the division information includes a plurality of bits, and represents an existence of one division, of said encoding subject block, by one bit in the plurality of bits of the division information.

12. An image processing apparatus comprising:
    input means for inputting multi-value image data indicative of either a first type of image which is generally expressed by multi-value image data, or a second type of image which is inherently expressed by binary image data;
    conversion means for executing one of a first conversion for the first type image or a second conversion for the second type image on the inputted multi-value image data, the first conversion including at least a wavelet conversion, and the second conversion including a binary conversion;
    encoding means for encoding plural conversion coefficients obtained by said conversion means using a block dividing process,
    wherein said block dividing process divides a subject block into plural sub-blocks according to a result obtained by checking whether a coefficient larger than a predetermined value exists within the subject block in the plural conversion coefficients, and generates encoded data by repeating the check and the division based on a new subject block of at least one included in the sub-blocks.

13. An apparatus according to claim 12, further comprising discriminating means for discriminating a type of an image presented by the image data, wherein said conversion means executes one of the first conversion or the second conversion on the input image data according to a result obtained by said discriminating means.

14. An apparatus according to claim 12, wherein the second conversion includes a prediction encoding process.

15. An apparatus according to claim 13, wherein the type of the image includes a character or a line image and natural image.

16. An apparatus according to claim 12, wherein the division finishes when the subject block reaches a predetermined size.

17. An image processing method comprising:
    an input step of inputting multi-value image data indicative of either a first type of image which is generally expressed by multi-value image data, or a second type of image which is inherently expressed by binary image data;
    a conversion step of executing one of a first conversion for the first type image or a second conversion for the second type image on the inputted multi-value image data, the first conversion including at least a wavelet conversion, and the second conversion including a binary conversion;
    an encoding step of encoding plural conversion coefficients obtained by said conversion step using a block dividing process,
    wherein said block dividing process divides a subject block into plural sub-blocks according to a result obtained by checking whether a coefficient larger than a predetermined value exists within the subject block in the plural conversion coefficients, and generates encoded data by repeating the check and the division based on a new subject block of at least one included in the sub-blocks.

18. A computer readable medium having recorded thereon codes for implementing a computer implementable method of image processing comprising:

an input step of inputting multi-value image data indicative of either a first type of image which is generally expressed by multi-value image data, or a second type of image which is inherently expressed by binary image data;

a conversion step of executing one of a first conversion for the first type image or a second conversion for the second type image on the inputted multi-value image data, the first conversion including at least a wavelet conversion, and the second conversion including a binary conversion;

an encoding step of encoding plural conversion coefficients obtained by said conversion step using a block dividing process, wherein said block dividing process divides a subject block into plural sub-blocks according to a result obtained by checking whether a coefficient larger than a predetermined value exists within the subject block in the plural conversion coefficients, and generates encoded data by repeating the check and the division based on a new subject block of at least one included in the sub-blocks.

* * * * *

UNITED STATES PATENT AND TRADEMARK OFFICE
CERTIFICATE OF CORRECTION

PATENT NO. : 6,337,929 B1
DATED : January 8, 2002
INVENTOR(S) : Hiroshi Kajiwara et al.

Page 1 of 1

It is certified that error appears in the above-identified patent and that said Letters Patent is hereby corrected as shown below:

Column 2,
Line 20, "encoding" should read -- encode --.

Column 3,
Line 3, "sowing" should read -- showing --.

Column 7,
Line 25, "blocks Tm" should read -- blocks $T_m$ --.

Column 9,
Line 64, "a" should read -- an --.

Column 13,
Line 5, ""0"is" should read -- "0" is --.
Line 61, "are" should read -- is --.

Column 18,
Line 34, ""0"exists." should read -- "0" exists. --.

Column 23,
Line 1, "Those" should read -- That --.

Column 26,
Line 38, "by" should read -- in --.

Signed and Sealed this

Fourteenth Day of May, 2002

Attest:

JAMES E. ROGAN
*Attesting Officer*    *Director of the United States Patent and Trademark Office*